(12) United States Patent
Tomita

(10) Patent No.: US 8,384,752 B2
(45) Date of Patent: Feb. 26, 2013

(54) OPTICAL SCANNING UNIT AND IMAGE FORMING APPARATUS USING SAME

(75) Inventor: Yasumasa Tomita, Mitaka (JP)

(73) Assignee: Ricoh Company, Ltd., Tokyo (JP)

( * ) Notice: Subject to any disclaimer, the term of this patent is extended or adjusted under 35 U.S.C. 154(b) by 1119 days.

(21) Appl. No.: 12/076,200

(22) Filed: Mar. 14, 2008

(65) Prior Publication Data

US 2008/0225102 A1 Sep. 18, 2008

(30) Foreign Application Priority Data

Mar. 16, 2007 (JP) ................ 2007-068140

(51) Int. Cl.
*B41J 2/435* (2006.01)

(52) U.S. Cl. ..................................... 347/224

(58) Field of Classification Search ............ 347/224
See application file for complete search history.

(56) References Cited

U.S. PATENT DOCUMENTS

| | | | |
|---|---|---|---|
| 2005/0111065 A1 | 5/2005 | Tomita |
| 2006/0139440 A1 | 6/2006 | Tomita |
| 2007/0030333 A1 | 2/2007 | Tomita |
| 2007/0052957 A1 | 3/2007 | Tomita |
| 2007/0159674 A1 | 7/2007 | Tomita |
| 2007/0253049 A1 | 11/2007 | Tomita |

FOREIGN PATENT DOCUMENTS

| | | |
|---|---|---|
| JP | 11-287966 | 10/1999 |
| JP | 2001-265085 | 9/2001 |
| JP | 2001-265090 | 9/2001 |
| JP | 2002-166593 | 6/2002 |
| JP | 2002-316437 | 10/2002 |
| JP | 2004-133076 | 4/2004 |
| JP | 2004-170755 | 6/2004 |
| JP | 2005-134623 | 5/2005 |
| JP | 2005-262555 | 9/2005 |
| JP | 2005-316302 | 11/2005 |
| JP | 2006-030705 | 2/2006 |
| JP | 2006-078725 | 3/2006 |
| JP | 2006-084978 | 3/2006 |
| JP | 2006-085104 | 3/2006 |
| JP | 2006-259408 | 9/2006 |
| JP | 2007-293202 | 11/2007 |

OTHER PUBLICATIONS

Japanese Patent Office Communication dated Jul. 22, 2011 issued in corresponding Japanese Application No. 2007-068140.

*Primary Examiner* — Ryan Lepisto
*Assistant Examiner* — Erin Chiem
(74) *Attorney, Agent, or Firm* — Harness, Dickey & Pierce, P.L.C.

(57) ABSTRACT

An optical scanning unit used in an image forming apparatus having a latent image carrier includes a light emitter, a rotary deflector, an inclination adjustment unit, and a controller. The light emitter emits a light beam. The rotary deflector deflects and scans the light beam onto a surface of the latent image carrier. The inclination adjustment unit adjusts an inclination of a scan line corresponding to the light beam relative to a reference scan line on the latent image carrier. The controller changes at least one of a linear velocity of the latent image carrier and a rotation speed of the rotary deflector so as to change a ratio between the linear velocity of the latent image carrier and a scan speed of the light beam, and controls the inclination adjustment unit based on the ratio to keep the scan line from inclining relative to the reference scan line.

21 Claims, 11 Drawing Sheets

OPTICAL SCANNING UNIT AND IMAGE FORMING APPARATUS USING SAME

CROSS-REFERENCE TO RELATED APPLICATIONS

The present patent application claims priority under 35 U.S.C. §119 from Japanese Patent Application No. 2007-068140 filed on Mar. 16, 2007 in the Japan Patent Office, the entire contents of which are hereby incorporated-herein by reference.

BACKGROUND OF THE INVENTION

1. Field of the Invention

The present invention relates to an optical scanning unit and an image forming apparatus using the optical scanning unit, and more specifically, an optical scanning unit to optically write an image and an image forming apparatus using the optical scanning unit.

2. Description of the Background

Typically, an image forming apparatus used as a printer, facsimile machine, copier, and multi-functional device thereof has an optical scanning unit to write a latent image on an image carrier or photoconductor. Such an optical scanning unit is constructed to deflect a light flux or beam emitted from a light source by a rotary deflector and thus expose and scan the photoconductor with the light beam.

One conventional image forming apparatus forms a latent image on an image carrier by such an optical scanning unit, visualizes the latent image as a toner image by a developing unit, transfers and fixes the toner image on a recording material, such as a transfer paper sheet, by a transfer unit and a fixing unit, and discharges the recording material from the image forming apparatus.

Recently, for such an image forming apparatus, there has been a demand for compatibility with a wide variety of paper types including a postcard, release paper, and thin paper such as tracing paper, in addition to plain paper.

One difficulty faced in attempting to accommodate such different media is that, for example, fixing a toner image on a thick sheet may need a relatively large amount of heat compared to fixing the same image on an ordinary sheet of plain paper. Therefore, one type of conventional image forming apparatus reduces the processing speed of a photoconductor (hereinafter "linear velocity") so as to reduce its printing speed. By so doing, this type of conventional image forming apparatus increases the heat amount per unit time to secure stable fixing performance, with the printing speed for such thick paper set slower than the printing speed for plain paper.

Further, in response to recent increasing needs for color printing, there have been proposed image forming apparatuses capable of forming full-color images by superimposing, one on top of the other, toner of four colors of black, magenta, cyan, and yellow, for example. Such a conventional full-color image forming apparatus needs a relatively large amount of heat when fixing toner of four colors compared to when fixing toner of the single black color, for example. Consequently, the conventional full-color image forming apparatus forms a full-color image at a reduced printing speed compared to when forming a black-and-white image.

As described above, in response to various demands, certain image forming apparatuses are capable of operating a photoconductor at a plurality of linear velocities and switching the linear velocities of the photoconductor depending on operation modes defined by paper type, monochrome or color printing, and the like.

In this regard, the action of such an optical scanning unit to the linear velocity of a photoconductor is described below.

For example, where the linear velocity of the photoconductor is "V" mm/s, a number of reflective faces of a rotary deflector is "M", a number of light beams directed onto a surface of the photoconductor is "N", and a pixel density is "ρ" dpi (dot per inch), the rotation speed "Rm" of the rotary deflector in the optical scanning unit is expressed by the following equation:

$$Rm=(60\times\rho\times V)/(25.4\times M\times N).$$

As indicated in the above equation, normally, as the linear velocity V of the photoconductor increases, the rotation speed Rm of the rotary deflector also increases. By contrast, as the linear velocity V decreases, the rotation speed Rm also decreases.

A DC (direct current) brushless motor is generally used as a motor in the rotary deflector. For such a motor, the optimal range of its rotation speed is determined to a certain degree by the optimal range of an input clock to the motor, bearing type or structure, or the like.

However, when forming an image at a reduced linear velocity of the photoconductor in thick-sheet printing or full-color printing, the motor may be operated at a rotation speed significantly lower than the optimal range, thereby worsening low-frequency jitter or uneven rotation of the rotary deflector. Consequently, image failures such as image fluctuation may be generated.

Accordingly, one proposed optical scanning unit is capable of simultaneously scanning a plurality of light beams onto a surface of a photoconductor drum, and also reduces the number of light beams directed onto the surface of the photoconductor if the linear velocity V of the photoconductor is lower than a certain value. As implied in the equation above, such a reduction in the number of light beams can offset a reduction in the rotation speed Rm of the rotary deflector that may be generated by a reduction in the linear velocity V of the photoconductor in thick-sheet printing or full-color printing.

As a result, the motor of the rotary deflector may still operate within the optimal range of the rotation speed even when forming an image at such a reduced linear velocity V of the photoconductor, thereby suppressing low-frequency jitter or uneven rotation of the rotary deflector.

In such an optical scanning unit, a scan speed Vimg of a scan line is proportional to the rotation speed Rm of the rotary deflector, and therefore proportionally decreases with a reduction of the rotation speed Rm of the rotary deflector. When a light flux or beam from a light source in such an optical scanning unit scans the surface of the photoconductor, the photoconductor is rotating at a linear velocity V. As a result, a scan line by the light flux may be inclined relative to an ideal or reference scan line depending on relative speed between the scan speed Vimg of the scan line and the linear velocity V of the photoconductor.

For example, where "L" represents a length of one scan line scanned across the photoconductor, the time "t" in which the scan line is scanned across the photoconductor is t=L/Vimg. Further, an inclination amount α of the scan line relative to the reference scan line in a sub-scan direction is expressed by the following equation:

$$\alpha=t\times V=(V/Vimg)\times L.$$

The optical scanning unit is constructed so that a scan line is not inclined relative to such a reference scan line when printing an ordinary sheet of plain paper. Accordingly, if the rate of reduction of the linear velocity V is identical to the rate of reduction of the scan speed Vimg, the inclination amount α also remains identical, and thus the scan line is not inclined relative to the reference scan line in the sub-scan direction.

However, according to one conventional optical scanning unit, when a rate of reduction of the rotation speed Rm is relatively small compared to a rate of reduction of the linear velocity V, the rate of reduction of the scan speed Vimg, which is proportional to the rotation speed Rm, also decreases compared to the rate of reduction of the linear velocity Vimg. As a result, a ratio K of the linear velocity V to the scan speed Vimg (K=V/Vimg) may be changed. A change in the ratio K of the linear velocity V to the scan speed Vimg may result in an inclination in the scan line scanned across the photoconductor, thereby generating an inclined image.

Furthermore, even when the rotary deflector is controlled to operate at a designated rotation speed, with extended use over time the rotary deflector may begin to rotate at a rotation speed that deviates from the designated rotation speed, shifting the linear velocity V from a set value. In such a case, the ratio K of the linear velocity V to the scan speed Vimg may also be changed, thereby generating an inclination of the scan line and an inclined image.

Thus, there is still a need for an optical scanning unit capable of suppressing an inclination of a scan line when the ratio between the linear velocity of an image carrier and the scan speed of the scan line changes, and an image forming apparatus having such an optical scanning unit.

SUMMARY OF THE INVENTION

Exemplary embodiments of the present invention provide an optical scanning unit capable of suppressing an inclination of a scan line when the ratio between the linear velocity of an image carrier and the scan speed of the scan line, and an image forming apparatus having the optical scanning unit.

In one exemplary embodiment of the present invention, an optical scanning unit used in an image forming apparatus having a latent image carrier includes a light emitter, a rotary deflector, an inclination adjustment unit, and a controller. The light emitter emits a light beam. The rotary deflector deflects and scans the light beam, emitted from the light emitter, onto a surface of the latent image carrier. The inclination adjustment unit adjusts an inclination of a scan line corresponding to the light beam relative to a reference scan line on the latent image carrier. The controller changes at least one of a linear velocity of the latent image carrier and a rotation speed of the rotary deflector so as to change a ratio between the linear velocity of the latent image carrier and a scan speed of the light beam for scanning the surface of the latent image carrier, and controls the inclination adjustment unit based on the ratio between the scan speed of the light beam and the linear velocity of the latent image carrier to keep the scan line from inclining relative to the reference scan line.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
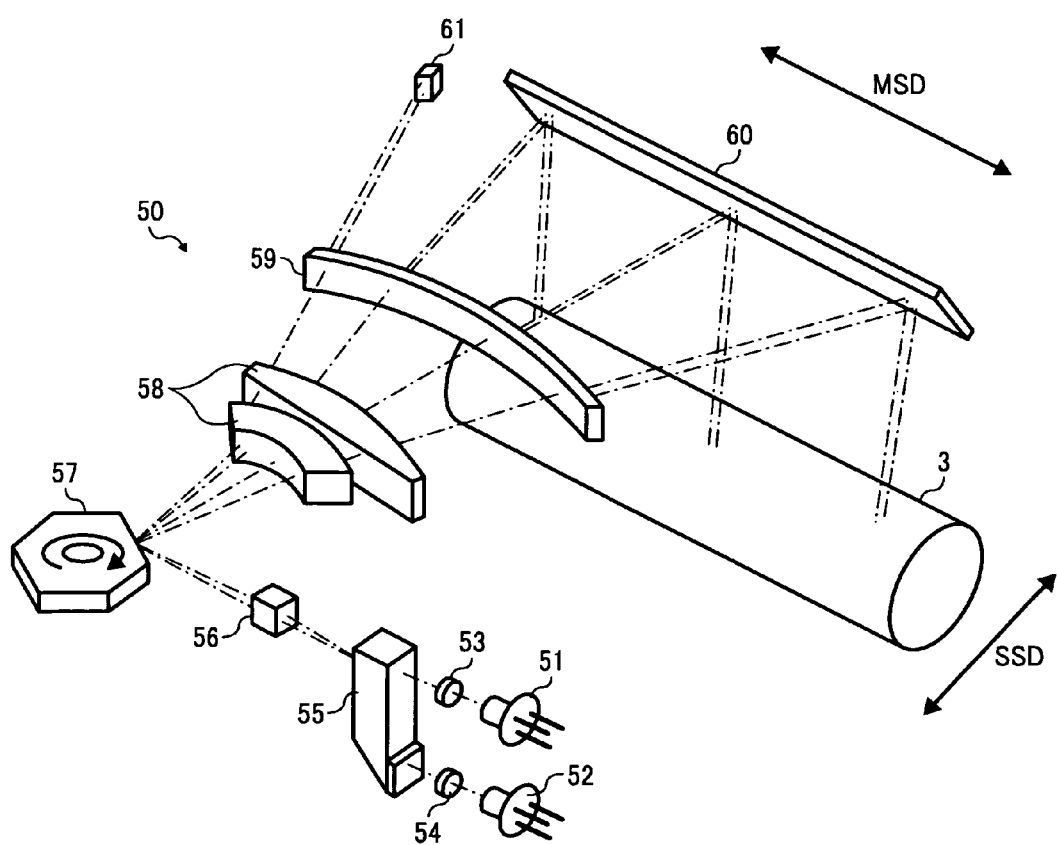
FIG. 1 is a perspective view illustrating an optical scanning unit according to one exemplary embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION OF EXEMPLARY EMBODIMENTS

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve the same results. For the sake of simplicity, the same reference numerals are used in the drawings and the descriptions for the same materials and constituent parts having the same functions, and redundant descriptions thereof are omitted.

Exemplary embodiments of the present disclosure are now described below with reference to the accompanying drawings. It should be noted that, in a later-described comparative example, exemplary embodiment, and alternative example, the same reference numerals are used for the same constituent elements such as parts and materials having the same functions and achieving the same effects, and redundant descriptions thereof are omitted.

FIG. 1 is a perspective view illustrating an optical scanning unit according to one exemplary embodiment of the present invention.

In FIG. 1, an optical scanning unit 50A employs a multi-beam system and has a multi-beam light source unit serving as a light emitter. The multi-beam light source unit further includes a first semiconductor laser 51 and a second semiconductor laser 52. Multiple beams emitted from the semiconductor lasers 51 and 52 are collimated by collimate lenses 53 and 54 into parallel light fluxes. The light fluxes are combined by a synthetic prism 55 and are focused by a cylinder lens 55 in a sub-scan direction indicated by an arrow SSD in FIG. 1. Subsequently, the multiple beams are deflected by a polygon mirror 57, serving as a rotary deflector, to pass through fθ lenses 58 and a toroidal lens 59 so that dot pitches become substantially uniform in a main scan direction indicated by an arrow MSD in FIG. 1. The multiple beams are deflected by a reflection mirror 60 to scan a photoconductor drum 3. Thus, print data is written on the photoconductor drum 3.

A synchronous detection sensor 61 is disposed outside an image area. When the synchronous detection sensor 61 detects a laser beam emitted from the first semiconductor laser 51, the detection timing of the laser beam is used as a reference for determining a writing start position of a first main-scan line.

Further, when the synchronous detection sensor 61 detects a laser beam emitted from the second semiconductor laser 52, the detection timing of the laser beam is used as a reference for determining a writing start position of a second main-scan line. Respective writing start positions are similarly determined for other main-scan lines to adjust a position of a target image in the main scan direction MSD.

An image forming apparatus according to one exemplary embodiment has the optical scanning unit 50 as an optical writing unit and a photoconductor drum capable of operating at a plurality of linear velocities (hereinafter "linear velocities" or "a linear velocity").

For example, as illustrated in TABLE. 1, the linear velocities may include 77, 115, 154, 205, and 230 mm/sec. Corresponding operation modes for the respective linear velocities may be as follows: Pattern A: 77 mm/sec and heavy paper (253 g/m² or less); Pattern B: 115 mm/sec and heavy paper (169 g/m² or less); Pattern C: 154 mm/sec, standard paper, and full-color and low-speed mode; Pattern D: 205 mm/sec, standard paper, and full-color and high-speed mode; and Pattern E: 230 mm/sec, standard paper, and black-and-white and high-speed mode.

For example, when the optical scanning unit 50 is a multi-beam optical scanning unit having two optical sources as expressed by the number of optical sources N=2 in TABLE 1, the number of revolutions per minute (hereinafter "rotation speed") Rm of the rotary deflector corresponding to each linear velocity described above may be as shown in TABLE 1.

rotation speed of the rotary deflector Rdef is 27165.4 rpm, in which "def" refers to a default value.

As shown in TABLE 1, if the number of light sources is fixed at two, the rotation speed of the rotary deflector has a range between 9094.5 and 27165.4 rpm when the linear velocity has the above-described range. The maximum rotation speed is approximately three times higher than the minimum rotation speed.

In a case in which the rotation speed has such a range, a low-speed rotation may deteriorate into low-frequency jitter and/or rotation fluctuation, resulting in image degradation such as image fluctuation.

When a DC brushless motor (hereinafter "polygon motor") is used to drive the polygon mirror 57 serving as the rotary deflector, preferably the DC brushless motor rotates at a rotation speed approximately 1.5 times greater than its minimum rotation speed. For example, when the type of a bearing that supports the polygon mirror is a hydraulic pressure type, the rotation speed of the DC brushless motor may be in a range between 20,000 rpm and 30,000 rpm, or between 25,000 rpm and 37,500 rpm. If the DC brushless motor is used beyond such a range of the rotation speed, the characteristics of the motor may not be fully actuated.

In addition, if the DC brushless motor has a relatively wide range of rotation speed, a correspondingly complex bearing structure and circuit constant optimization may be needed, resulting in an increase in the cost of components for the rotation deflector.

Hence, in an image forming apparatus according to one exemplary embodiment, when the linear velocity is reduced from Vmax to V (Vmax is greater than V), the rotation speed Rm of the rotary deflector is reduced to Rdef×(V/Vmax) if V/Vmax is greater than 0.75 (V/Vmax>0.75), that is, V/Vmax is greater than 75 percent of the maximum linear velocity. At this time, Vmax is the maximum linear velocity, Ndef is the number of light beams at Vmax, and Rdef is the rotation speed of the rotary deflector, in which "def" refers to a default value.

On the other hand, if V/Vmax is 0.75 or less (V/Vmax≦0.75), that is, V/Vmax is 75 percent or less of the maximum linear velocity, the number of light sources is reduced to Ndef/m, where m is a natural number, and the rotation speed Rm of the rotary deflector is set to Rdef×(V/Vmax)×m.

In other words, when reducing the linear velocity to a value greater than 75 percent of the maximum linear velocity, the

TABLE 1

|  | PATTERN A | PATTERN B | PATTERN C | PATTERN D | PATTERN E |
|---|---|---|---|---|---|
| LINEAR VRELOCITY: V [mm/sec] | 77 | 115 | 154 | 205 | 230 |
| NUMBER OF BEAMS: N | 2 | 2 | 2 | 2 | 2 |
| NUMBER OF REFLECTIVE FACES: M | 6 | 6 | 6 | 6 | 6 |
| PIXEL DENSITY: ρ [dpi] | 600 | 600 | 600 | 600 | 600 |
| ROTATION SPEED: Rm [rpm] | 9094.5 | 13582.7 | 18189.0 | 24212.6 | 27165:4 |

In Table 1, "V" represents linear velocity, "Rm" represents the rotation speed of the rotary deflector, "M" represents the number of deflecting faces of the rotary deflector, "N" is the number of light sources, and "ρ" represents pixel density.

In TABLE 1, the maximum linear velocity Vmax is 230 mm/sec, which is a linear velocity of PATTERN E. In PATTERN E, the number of light beams Ndef is two, and the rotation speed of the rotary deflector is reduced in accordance with a ratio of the reduced linear velocity to the maximum linear velocity.

On the other hand, when reducing the linear velocity to a value less than or equal to 75 percent of the maximum linear velocity, the number of light sources is reduced, and the rotation speed Rm of the rotary deflector is set to Rdef×(V/Vmax)×m.

Normally, the DC brushless motor used in the rotary deflector may be stably operated when the rotation speed is approximately 75 percent of the optimal rotation speed. Thus, in this exemplary embodiment, the ratio of 0.75:1, or 75 percent of the maximum linear velocity, is used as a threshold value for executing control to reduce the rotation speed of the rotary deflector, or both the rotation speed of the rotary deflector and the number of light sources. It should be noted that the ratio is not limited to be 75 percent and may be set to any other suitable number based on the characteristics of the polygon motor.

Next, a setting for controlling the optical scanning unit 50 is described with reference to TABLE 2.

TABLE 2

|  | PATTERN A | PATTERN B | PATTERN C | PATTERN D | PATTERN E |
|---|---|---|---|---|---|
| LINEAR VRELOCITY: V [mm/sec] | 77 | 115 | 154 | 205 | 230 |
| RATIO AGAINST Vmax | 0.3 | 0.5 | 0.7 | 0.9 | — |
| NUMBER OF BEAMS: N | 1 | 1 | 1 | 2 | 2 |
| NUMBER OF REFLECTIVE FACES: M | 6 | 6 | 6 | 6 | 6 |
| PIXEL DENSITY: $\rho$ [dpi] | 600 | 600 | 600 | 600 | 600 |
| ROTATION SPEED: Rm [rpm] | 18189.0 | 27165.4 | 36378.0 | 24212.6 | 27165.4 |
| V/N | 77.0 | 115.0 | 154.0 | 102.5 | 115.0 |

As may be seen in TABLE 2, the maximum linear velocity Vmax is 230 mm/sec. The number N of light beams from the light source is 2 when the maximum linear velocity Vmax is 230 mm/sec. PATTERN E is a default setting.

In PATTERN D, since V/Vmax is greater than 0.75, that is, V/Vmax>0.75, the number of beams remains unchanged and the rotation speed of the polygon mirror 57 is reduced from 27165.4 rpm to 24212.6 rpm in accordance with the linear velocity ratio between PATTERN D and PATTERN E.

In PATTERNS A, B, and C, the number of beams is reduced by half, that is, from 2 to 1. The rotation speed Rm of the polygon mirror 57 is set to Rdef×(V/Vmax)×2. The rotation speeds of the polygon mirror 57 for PATTERNS A, B and C are 18189.0, 27165.4, and 36378.0, respectively.

As described above, the rotation speed of the rotary deflector has a range between 18189.0 rpm and 36378.0 rpm, and the maximum rotation speed is at most approximately twice as fast as the minimum rotation speed. Thus, the rotation speed of the polygon mirror 57 is set to have a narrow range, allowing the polygon motor to be operated under more favorable conditions.

When Rm is greater than Rdef (Rm>Rdef) in changing the rotation speed of the rotary deflector, preferably the rotation speed is set so that Rm/Rdef is 1.5 or less, that is, Rm/Rdef<1.5. In other words, when the rotation speed of the polygon mirror 57 is increased relative to the rotation speed at the default linear velocity, the ratio of the increased rotation speed to the default rotation speed is preferably set to 1.5:1.0 or less.

In settings listed in TABLE 2, the maximum rotation speed Rmax is 36378.0 rpm, and the rotation speed at the default linear velocity Rdef is 27165.4 rpm. The ratio of Rmax to Rdef is approximately 1.3:1.00, that is, Rmax is not more than 1.5 times of Rdef.

An increase in the rotation speed of the rotary deflector may have unfavorable effects, for example, an increase in internal temperature, noise, and/or vibration of the image forming apparatus. However, when the increase in the rotation speed is not more than 1.5 times the default rotation speed, such unfavorable effects may be effectively suppressed. Further, the rotation speed of the polygon motor is set to have a relatively narrow range, allowing the polygon motor to be operated under more favorable conditions.

If Rmax/Rdef is greater than 1.5, that is, Rmax/Rdef>1.5, the rotation speed is reduced according to the linear velocity ratio, as described above. In other words, the rotation speed is determined by increasing or reducing the number of beams from the light source(s) such that Rmax/Rdef<1.5 is satisfied.

In the settings listed in TABLE 2, the rotation speed of the polygon mirror 57 has a range between 18189.0 rpm and 36378.0 rpm. When compared with the settings listed in TABLE 1, the rotation speed in TABLE 2 has a relatively narrow range, although the maximum rotation speed listed in TABLE 2 is still approximately twice the minimum rotation speed.

Accordingly, when V/Vmax is less than 0.5, that is, the linear velocity is less than 50 percent of the maximum linear velocity, the exposure scan may be performed while the pixel density in at least a sub-scan direction is doubled.

Furthermore, when V/Vmax is less than 0.5, that is, the linear velocity is less than 50 percent of the maximum linear velocity, the exposure scan may be performed on every other face of the plurality of reflective faces of the rotary deflector.

Figure 3:
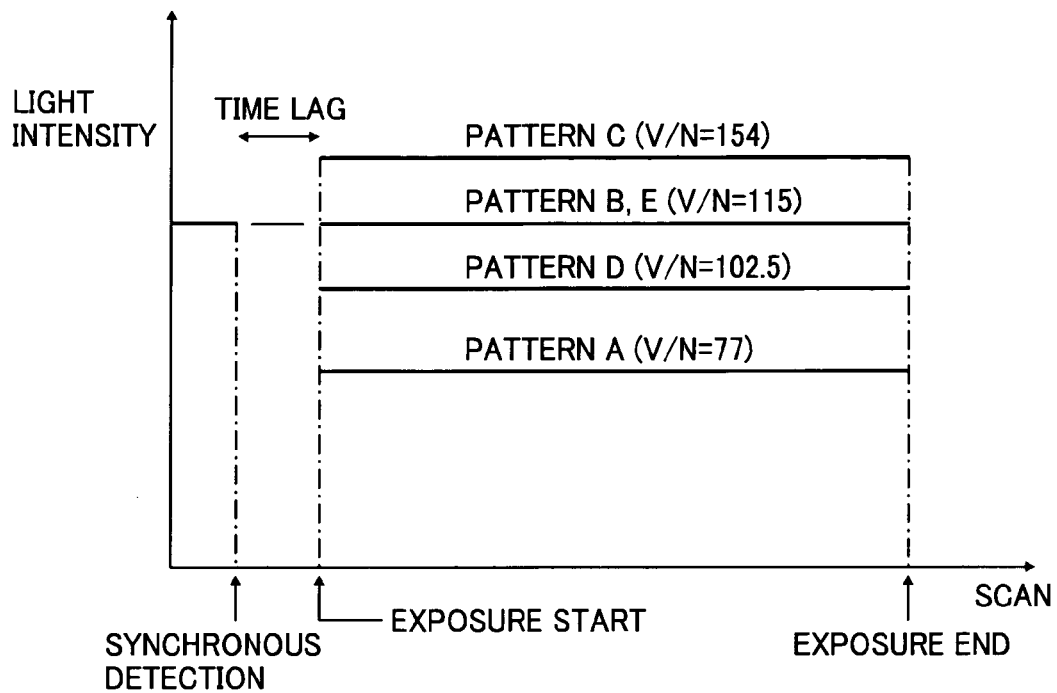
FIG. 3 is a conceptual view illustrating a control executed to keep the amount of light incident to a synchronous detector substantially constant.

With reference to FIG. 3, a detailed description is given of settings used when the exposure scan is performed with a doubled pixel density or on every other reflective face.

TABLE 3

|  | PATTERN A' | PATTERN A" |
|---|---|---|
| LINEAR VRELOCITY: V [mm/sec] | 77 | 77 |
| NUMBER OF BEAMS: N | 1 | 1 |
| NUMBER OF REFLECTIVE FACES: M | 6 | 3 |
| PIXEL DENSITY: $\rho$ [dpi] | 1200 | 600 |
| ROTATION SPEED: Rm [rpm] | 36378.0 | 36378.0 |
| V/N | 77.0 | 77.0 |

In the above-described setting of PATTERN A of TABLE 2, the linear velocity is 77 mm/sec and the rotation speed of the polygon mirror 57 is 18189.0 rpm. On the other hand, when the pixel density in the sub-scan direction is doubled from 600 dpi to 1200 dpi as shown in PATTERN A' of TABLE 3, the rotation speed may be set to 36378.0 rpm, which is twice as fast as the rotation speed of PATTERN A in TABLE 2.

As a result, the range of the rotation speed of the polygon mirror 57 is between 24212.6 rpm and 36378.0 rpm, and therefore the rotation speed has a relatively narrower range than any of the above-described ranges. It should be noted that the settings of PATTERN B through PATTERN E in TABLE 3 (not illustrated) are the same as the settings of PATTERN B through PATTERN E, respectively, in TABLE 2.

Furthermore, as listed in PATTERN A" in TABLE 3, when the exposure scan is performed on every other face of the plurality of reflective faces of the polygon mirror 57, the rotation speed may be doubled to 36378.0 rpm, which is twice as high as the rotation speed of PATTERN A in TABLE 2.

In this case, the range of the rotation speed of the polygon mirror 57 is between 24212.6 and 36378.0 rpm, and therefore the range of the rotation speed has a relatively narrow range. It should be noted that settings of PATTERN B through PATTERN E in TABLE 3 are the same as the settings of PATTERN B through PATTERN E in TABLE 2.

Accordingly, when the linear velocity is less than 50 percent of the maximum linear velocity, that is, V/Vmax is less than 0.5 (V/Vmax<0.5), the pixel density at least in the sub-scan direction may be doubled or the exposure scan performed on every other face of the plurality of reflective faces of the polygon mirror. As a result, Rm, which is the rotation speed of the polygon mirror 57, may be determined to satisfy Rmax≦1.5×Rmin. In other words, the maximum rotation speed may be reduced to approximately 1.5 times as high as the minimum rotation speed of the rotary deflector. Thus, the range of the rotation speed of the rotary deflector may be narrowed, allowing the polygon motor to be operated in a preferable condition.

Figure 2:
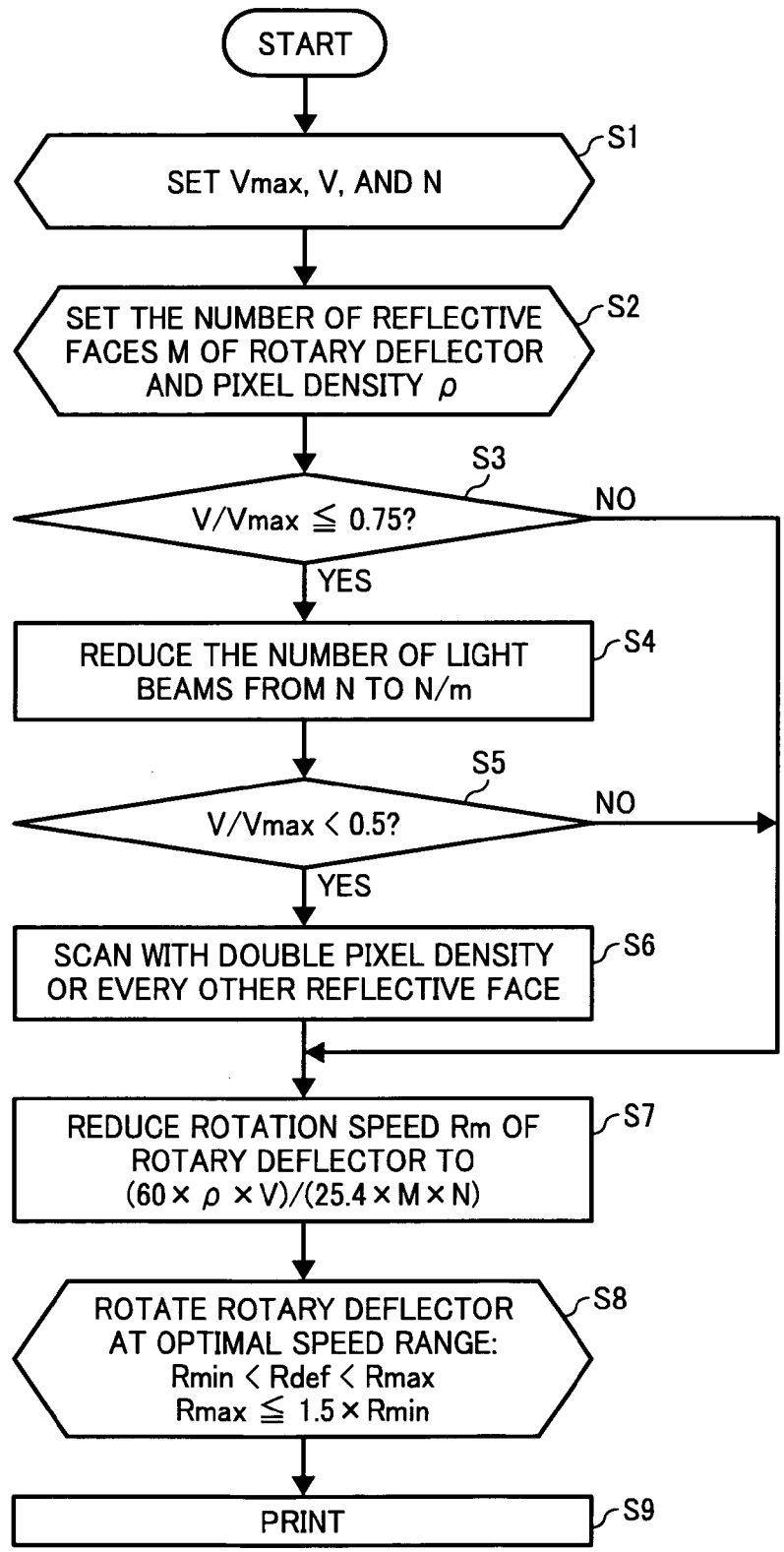
FIG. 2 is a flowchart illustrating a control process executed when switching the linear velocity of a photoconductor drum.

FIG. 2 is a flowchart illustrating a control process executed when switching the linear velocity of a photoconductor drum.

As illustrated in FIG. 2, values necessary for controlling the optical scanning unit 50 are set at S1 and S2. At S1, a maximum linear velocity Vmax, a target linear velocity V, and the number of light sources or light beams N are set.

At S2, the number of reflection faces of the rotary deflector M and the pixel density ρ are set.

At S3, it is determined whether or not the linear velocity V is 75 percent or less of the maximum linear velocity Vmax. If V/Vmax is greater than 0.75 ("NO" at S3), then processing proceeds to S7, and at S7 the rotation speed of the rotary deflector is reduced.

Alternatively, if V/Vmax is 0.75 or less ("YES" at S3), processing proceeds to S4, and at S4 the number of the light sources N is reduced to N/M where N and M are positive integers.

At S5, it is determined whether or not the liner velocity V is less than 50 percent of the maximum linear velocity Vmax, that is, V/Vmax<0.5 is satisfied.

If the linear velocity V is 50 percent or greater of the maximum linear velocity Vmax ("NO" at S5), processing proceeds to S7. In this case, the number of light sources has been reduced to N/M at S4.

Alternatively, if the liner velocity V is less than 50 percent of the maximum linear velocity Vmax, that is, V/Vmax<0.5 is satisfied ("YES" at S5), at S6 the pixel density ρ is doubled or the exposure scan is performed on every other face of the reflective faces of the polygon mirror, and processing proceeds to S7. In this case, the number of light sources has been reduced to N/M at S4.

At S7, the rotation speed of the rotary deflector is reduced. Specifically, the rotation speed Rm is reduced to Rdef×(V/Vmax)×M. For example, as illustrated in FIG. 2, Rm is reduced to (60×ρ×V)/(25.4×M×N).

Thus, at S8, the default rotation speed Rdef of the polygon mirror 57 is maintained in a range between the minimum rotation speed Rmin and the maximum rotation speed Rmax (Rmin<Rdef<Rmax). Meanwhile, the maximum rotation speed Rmax is maintained so as not to exceed 1.5 times the minimum rotation speed Rmin (Rmax≦1.5×Rmin). Further, processing proceeds to S9, and printing is executed.

Alternatively, the optical scanning unit 50 may be configured to be capable of performing stabilized output from light source(s) and enhancing the operating life of the light source(s) as follows.

Specifically, the optical scanning unit 50 is controlled such that a given linear velocity V and a given number of light sources or light beams N satisfy the following relation:

$$0.5\times(V\mathrm{max}/N\mathrm{def}) < V/N < 1.5\times(V\mathrm{max}/N\mathrm{def}),$$

where Vmax is a maximum linear velocity and Ndef is the number of light sources or light beams at Vmax.

As described above, when fixing a constant k, which is obtained based on an optical specification of a scan lens disposed in the optical scanning unit 50, an exposure sensitivity, and a desired exposure width of a photoconductor drum, an intensity P of light directed onto the photoconductor drum may be expressed as P=k×V/N, where V mm/sec is a linear velocity and N is a number of light sources.

Therefore, when the linear velocity is adjusted to keep exposure energy to the photoconductor drum per unit of time at a constant level, the light intensity at which the photoconductor drum is exposed to form a latent image thereon needs to be adjusted accordingly.

In other words, the output of the laser beam emitted from the light source may be adjusted in accordance with the change in the linear velocity.

For example, a laser diode used as the light source may not stably emit a light beam in an output range of 15 percent or less of rated output. Such unstable emission may result in various failures of a beam-spot diameter or LD modulation, thereby degrading image quality of a resultant image.

In addition, if the laser diode is used at a limit value of the rated output, the operating life of the laser diode may be shortened, which may adversely affect the reliability of the entire image forming apparatus.

Hence, according to the present exemplary embodiment, as described above, the optical scanning unit 50 is controlled so as to satisfy the following relation:

$$0.5\times(V\mathrm{max}/N\mathrm{def}) < V/N < 1.5\times(V\mathrm{max}/N\mathrm{def}).$$

With reference to the settings of TABLE 2, in the ratio V/N, where V is a linear velocity and N is the number of light sources, the minimum value of V/N is 77 in PATTERN A, whereas the maximum value of V/N is 154 in PATTERN C, and the default value is 115 in PATTERN E. The value of V/N in PATTERN B is the same as the default value 115, and the value of V/N in PATTERN D is 102.5. The above-described values satisfy the following relation:

$$0.5\times(V\mathrm{max}/N\mathrm{def}) < V/N < 1.5\times(V\mathrm{max}/N\mathrm{def}).$$

In other words, in the necessary light intensity given by P=k×V/N, the range of the light intensity has a value less than 1.5 times the rated output at its upper limit and a value more than 0.5 times the rated output at its lower limit. Accordingly, it is possible to use the light source in a range having enough allowance both at the upper and lower limits with respect to the rated output of the light source.

In such a range, it may not be necessary to readjust the output of light emission when switching between the linear velocities, since the optimal light intensity may easily be obtained by changing the number of oscillation pulses in the PWM (pulse width modulation) control of the light source.

Normally, such change in the PWM control is conducted electrically. For example, when the paper type or thickness of a transfer sheet is specified, a corresponding linear velocity may be selected, and in the meantime, the number of oscillation pulses of the light source may be regulated.

On the other hand, it is known that, in conventional image forming apparatuses, fluctuation in the amount of light incident to a synchronous detector in an optical scanning unit may result in fluctuation in the output of the optical scanning unit. Consequently, an appropriate timing for the writing start position may not be obtained. Such fluctuation may also result in image failures, for example, image fluctuation, deterioration in the accuracy of color alignment, or degradation of color reproduction in full-color image formation.

Hence, in the optical scanning unit 50 according to the present exemplary embodiment, when the linear velocity is changed, electric control operation is performed such that the amount of light incident to the synchronous detector, that is, the synchronous detection sensor 61 as illustrated in FIG. 1, is maintained at a certain amount.

For example, when a laser beam is led into the synchronous detection sensor 61 disposed outside an exposure area, the photoconductor drum is controlled to drive at the default linear velocity. At this time, the light intensity of the light source is set to the light intensity at Vmax in this case. After the synchronous detection sensor 61 detects the laser beam, there may be a little time lag or delay until the actual exposure scan is performed on the photoconductor drum. During such a time lag or delay, the light intensity of the light source may be controlled to return to an exposure light intensity used in actual writing operation.

FIG. 3 is a conceptual view illustrating a control executed to keep the amount of light incident to a synchronous detector substantially constant.

As illustrated in FIG. 3, the linear velocity of the photoconductor drum is maintained at the default linear velocity from the start of scan to the synchronous detection, which is the same for PATTERN B and PATTERN E. After the synchronous detection, the default linear velocity is switched to the linear velocity of one of PATTERNS A to E.

During a time lag between the synchronous detection and the start of exposure, the output of the light source is set to an exposure light intensity used in actual writing operation before the start of the exposure. From the start of the exposure to the end of the exposure, the light source emits light at a certain light intensity for each linear velocity of PATTERN A through PATTERN E and thus writing operation is performed.

Thus, the optical scanning unit is capable of starting writing operation at an appropriate timing. As a result, image failures, for example, image fluctuation, deterioration in the accuracy of the color alignment, or degradation of color reproduction in full-color image formation may be prevented to generate a favorable image.

Furthermore, in the optical scanning unit of the present exemplary embodiment, when changing the rotation speed of the rotary deflector or the polygon mirror 57, the writing start position in the main scan direction is corrected in unit of dot. For example, the writing start position in the main scan direction is corrected in unit of dot based on a detection timing of the synchronous detection sensor 61. The control of such correction may be performed by a common electric control.

Thus, a more accurate writing start position may be obtained. As a result, image failures, for example, image fluctuation, deterioration in the accuracy of the color alignment, or degradation of color reproduction in full-color image formation may be prevented to generate a favorable image.

Moreover, the optical scanning unit according to the present exemplary embodiment is capable of conducting the exposure scan using any number of light sources among the plurality of light sources provided in the optical scanning unit. In FIG. 1, as described above, the optical scanning unit has the two light sources, that is, the first and second semiconductor lasers 51 and 52. Form example, when the number of beams is set to one as illustrated in the settings of FIG. 2 or 3, any one of the semiconductor lasers 51 and 52 may be used to conduct the exposure scan.

Accordingly, if one of the plurality of light sources fails in operation due to breakage or deterioration earlier than the other one, an operation mode using a reduced number of light sources may be selected from, for example, PATTERNS A, B, C, A' and A" in TABLES 2 and 3. Thus, an interim measure may be performed without stopping the optical scanning unit, so that on-going image forming operation may be continuously performed.

In addition, when a user does not request high-speed printing, such an operation mode with a reduced number of light sources may be used to extend the product life of the light sources. In such a case, if one of the light sources becomes impaired, the optical scanning unit is capable of continuously operating.

In the present exemplary embodiment, when the linear velocity is reduced to a value equal to or less than 75 percent of the maximum linear velocity, the number of light sources is reduced and the rotation speed Rm of the rotary deflector is set to Rdef×(V/Vmax). Therefore, for such an operation mode with a reduced number of light sources, for example, PATTERN A, B, C, A', or A", the ratio of the linear velocity V with the rotation speed Rm of the polygon mirror is different from the ratio at the default operation mode.

Further, the rotation speed Rm of the polygon mirror is proportional to the scan speed Vimg of the light beam scanned on the photoconductor drum 3. Therefore, for such an operation mode with a reduced number of light sources, for example, PATTERN A, B, C, A', or A", the ratio K of the linear velocity V with the scan speed Vimg, that is, K=V/Vimg is also different from the ratio at the default operation mode.

Figure 4:
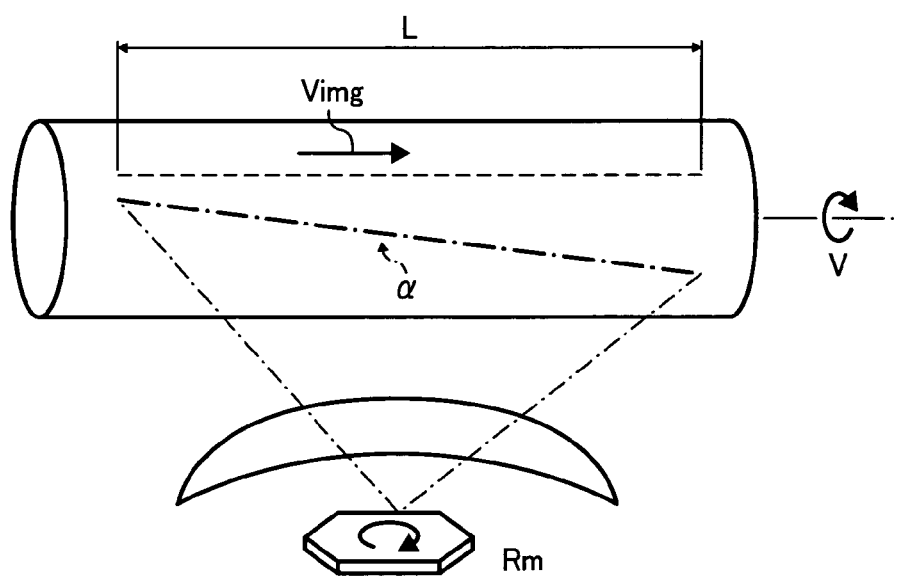
FIG. 4 illustrates an inclination of a scan line generated by a change in the ratio of linear velocity V to scan speed Vimg.

As illustrated in FIG. 4, the scan time t of the light beam on the photoconductor drum is expressed by t=L/Vimg, where the width at which a scan line is scanned across the photoconductor drum. Since the photoconductor drum is rotated at a linear velocity V during the scanning, the scan line across the photoconductor drum has an inclination of V×t, that is, V×(L/Vimg).

In such a case, normally, a relevant lens may be adjusted so that the scan line is not inclined at the linear velocity V and the scan speed Vimg in the default mode, as a reference scan line indicated by a dashed line in FIG. 4. For an operation mode with a normal number of light sources such as PATTERN D in TABLE 2, the ratio of the linear velocity V and the rotation speed Rm of the polygon mirror remain the same, and therefore the ratio K of the linear velocity V with the scan speed Vimg also remains the same. As a result, the inclination amount α of the scan line across the photoconductor drum is the same as the ratio at the default setting. Therefore, if a scan line is set to have no inclination at the linear velocity V and the scan speed Vimg in the default mode in the image forming apparatus, the scan line is not inclined in the normal mode.

By contrast, in the operation mode with a reduced number of light sources, for example, PATTERN A, B, C, A', or A", the ratio K of the linear velocity V with the scan speed Vimg is different from the ratio at the default operation mode. Therefore, the inclination amount of a scan line across the photoconductor drum is different from the inclination amount in the default setting. As a result, as illustrated in FIG. 4, the scan line is inclined relative to the reference scan line indicated by the dashed line.

Figure 5:
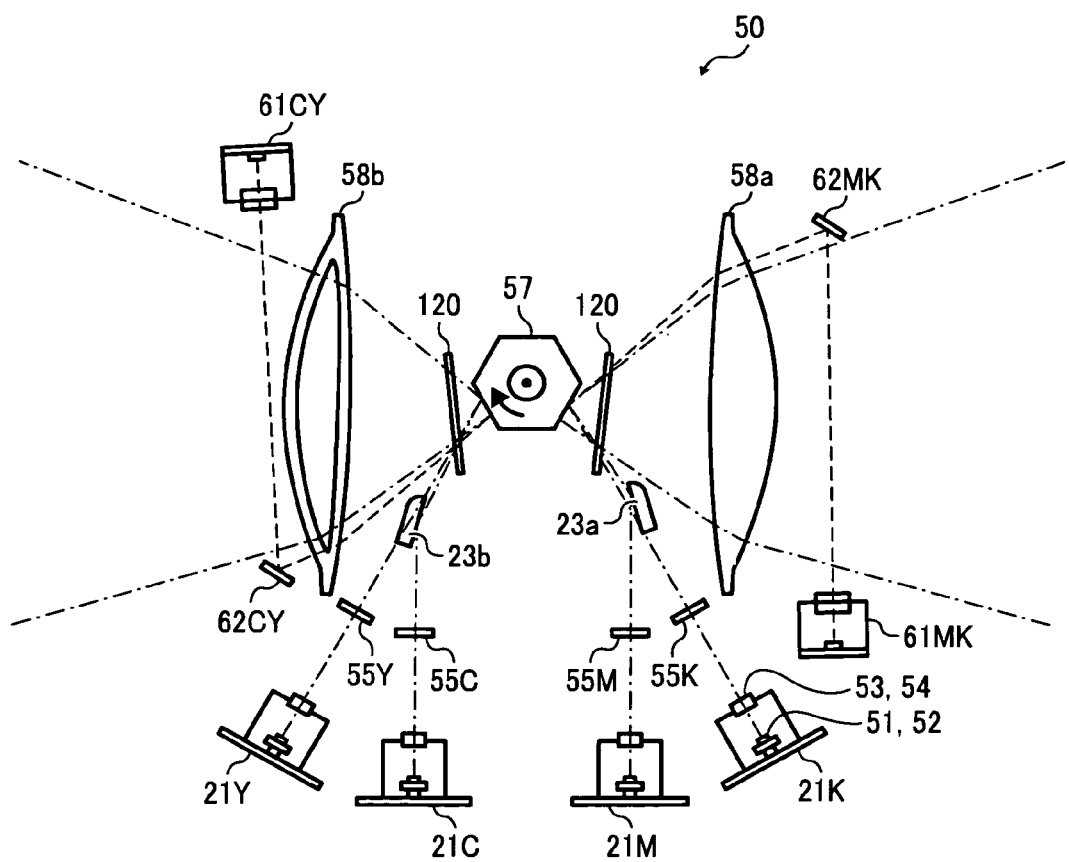
FIG. 5 is a schematic bottom view illustrating a configuration of an optical scanning unit of an opposed scanning type.
Figure 6:
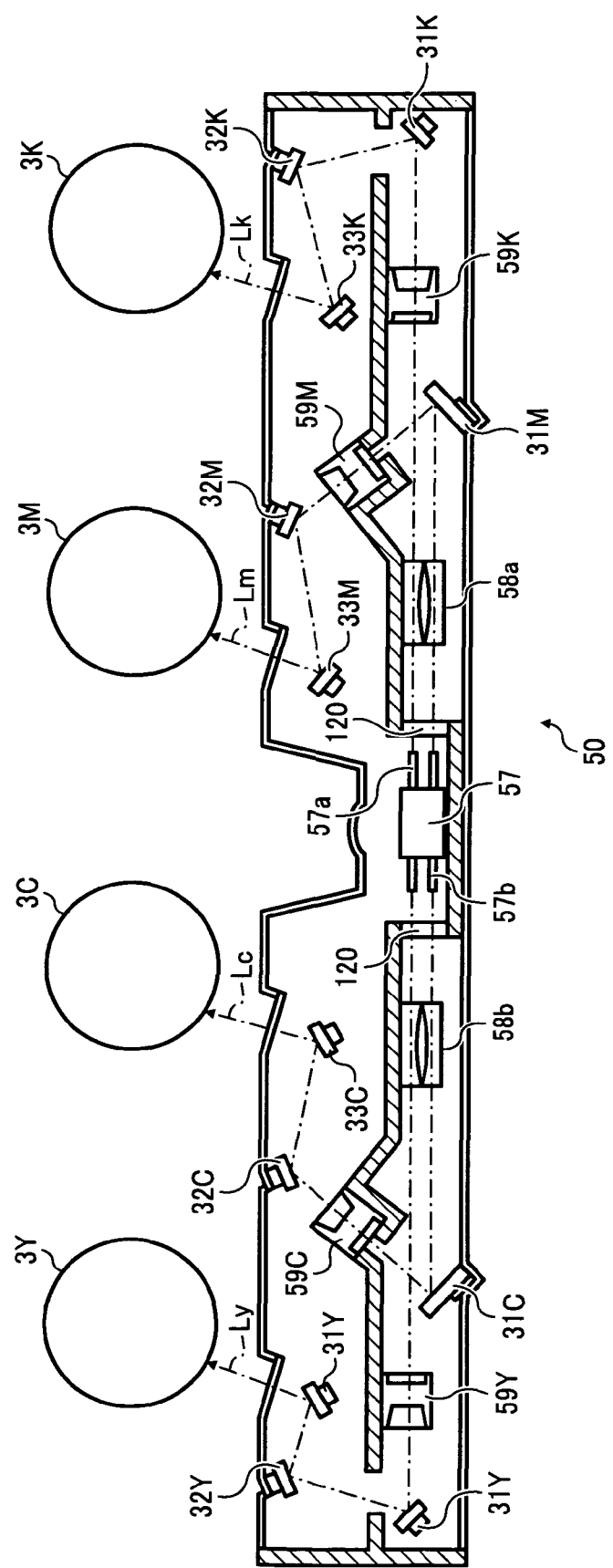
FIG. 6 is a schematic cross-sectional view illustrating a configuration of the optical scanning unit of FIG. 5.

As illustrated in FIGS. 5 and 6, according to an exemplary embodiment, an image forming apparatus may be a color image forming apparatus having an optical scanning unit of an opposed scanning type. In FIG. 5, a polygon mirror 57 is disposed on a substantially central portion of the optical scanning unit. Further, optical components, for example, fθ lenses 58a and 58b, and toroidal lenses 59Y, 59C, 59M, and 59K are disposed to be substantially point-symmetric with respect to a rotation axis of the polygon mirror 57.

However, in a conventional image forming apparatus having such a configuration, color shift may be generated in a resultant color image. For example, as illustrated in FIG. 7A, a light beam directed on each of photoconductor drums 3Y and 3C disposed on the left side of a polygon mirror in FIG. 7A is scanned from a lower portion to an upper portion.

Figure 7A:
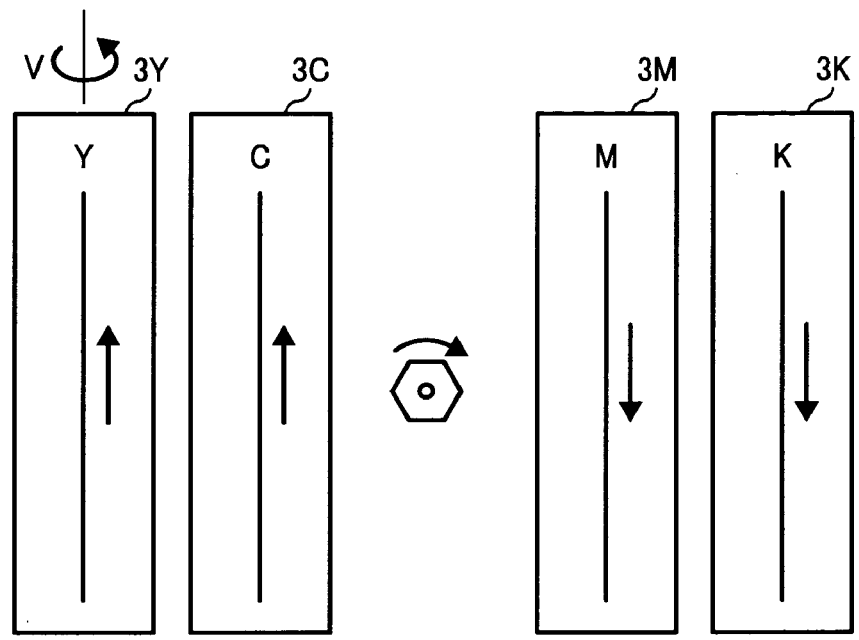
FIGS. 7A and 7B illustrate inclinations of scan lines generated by a change in the ratio K when using the optical scanning unit of FIG. 5.

By contrast, a light beam directed on each of photoconductor drums 3M and 3K disposed on the right side of a polygon mirror in FIG. 7A is scanned from an upper portion to a lower portion.

Figure 7B:
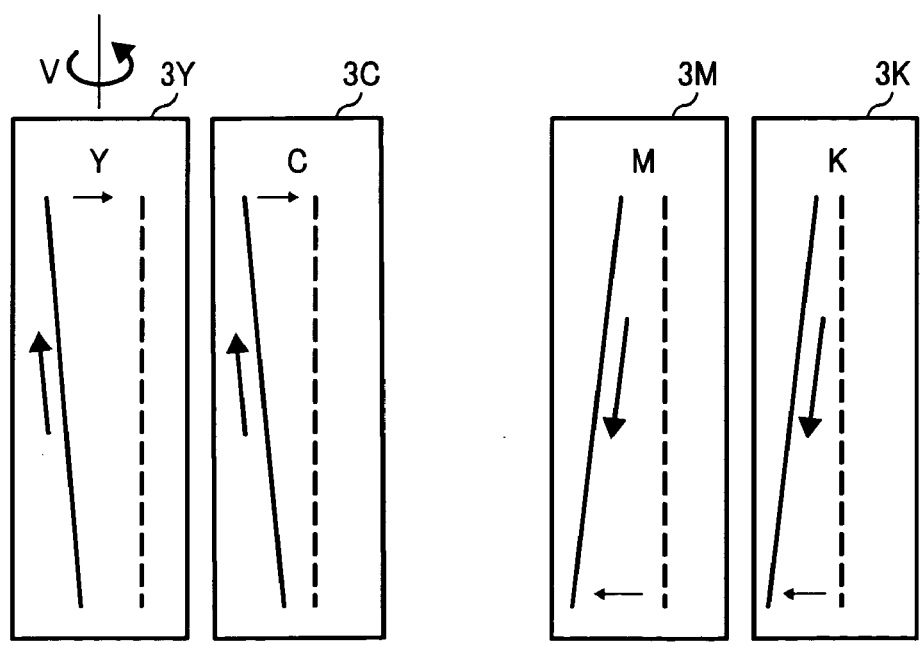

Accordingly, in the opposed scanning-type optical scanning unit, a scan direction of the light beam emitted onto each photoconductor drum disposed on the left side relative to the polygon mirror in FIG. 7A is opposite a scan direction of the light beam emitted onto each photoconductor drum disposed on the right side relative to the polygon mirror in FIG. 7A. As a result, as illustrated in FIG. 7B, a change in the ratio K of the linear velocity V to the scan speed Vimg may result in a difference in the inclination of scan line between the left-side photoconductor drums and the right-side photoconductor drums. Consequently, when yellow, cyan, magenta, and black color toners are superimposed one on top of the other to form a full-color image, for example, magenta and black color toners may not be appropriately superimposed on yellow and cyan color toners, resulting in a color shift in the full-color image.

Incidentally, a description of the optical scanning unit of the opposed scanning type is given later.

Incidentally, a color shift in the optical scanning unit of the opposed scanning type is described later.

Hence, according to the present exemplary embodiment, the optical scanning unit has an inclination adjustment mechanism to adjust the inclination of a scan line on the photoconductor drum in accordance with the ratio K (K=V/Vimg) of the linear velocity V to the scan speed Vimg at which multiple beams emitted from the light sources are scanned on the photoconductor drum.

Figure 8A:
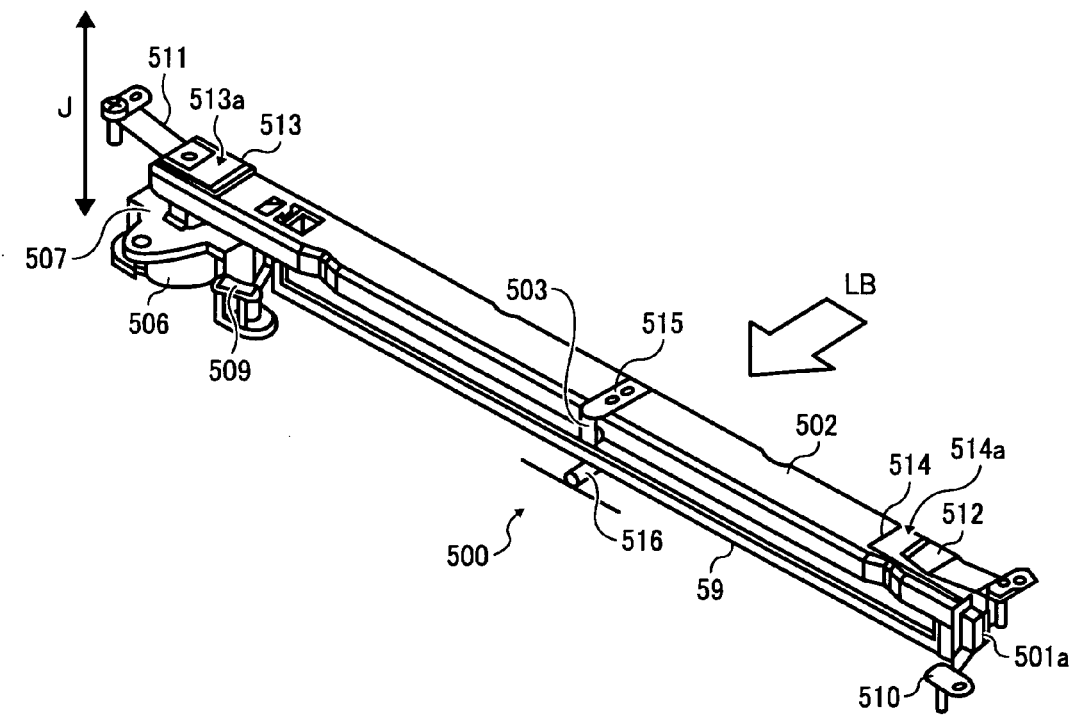
FIGS. 8A and 8B are perspective views illustrating a scan lens unit used in the optical scanning unit of FIG. 5.
Figure 8B:
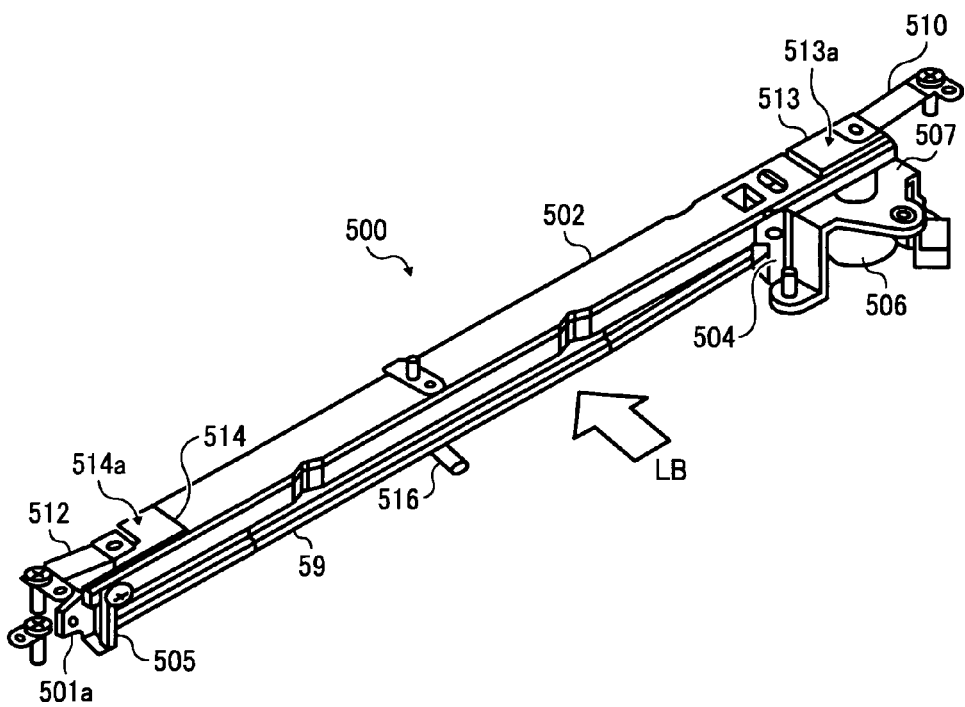

FIGS. 8A and 8B are perspective views of a scan lens unit 500 serving as the inclination adjustment mechanism.

In FIGS. 8A and 8B, the scan lens unit 500 has a bracket 502 that supports a toroidal lens 59, a leaf spring 503 that adjusts the bending of the bracket 502, leaf springs 504 and 505 that fixes the toroidal lens 59 and the bracket 502, a stepping motor 506 that automatically adjusts the inclination of a scan line, a motor holder 507, a screw receiving portion, a housing fixing member 509, leaf springs 510, 511, and 512 that support the scanning lens unit 500, smooth-surface members 513 and 514, and a screw 515 that adjusts the bending of the bracket 502.

The inclination of a scan line is adjusted by controlling a rotation angle of the stepping motor 506 in accordance with the ratio K of the linear velocity V to the scan speed Vimg. For example, the amount α of inclination to be adjusted is obtained by multiplying the ratio K by a length "L" of a scan line scanned across the photoconductor drum. The length L is a predetermined value in design, and the linear velocity V used to calculate the ratio K is determined according to each operation mode. Further, Vimg is obtained by multiplying a proportional coefficient γ, which is a predetermined value in design, by the rotation speed Rm of the polygon mirror, which is determined according to each operation mode.

When the rotation angle of the stepping motor 506 is controlled based on the obtained inclination adjustment amount α, an up-and-down screw mounted on the rotation shaft of the stepping motor 506 moving up and down, and one end portion of the scan lens unit 500 on the side of the stepping motor 506 is moved in directions indicated by a double arrow J in FIG. 7A.

For example, when the up-and-down screw moves up, the motor-side end portion of the scan lens unit 500 moves up against an energizing force of the leaf spring 511. The scan lens unit 500 swings around a support 516 to change its orientation. By contrast, when the up-and-down screw moves down, the motor-side end portion of the scan lens unit 500 moves down by an energizing force of the leaf spring 511. The scan lens unit 500 swings around the support 516 to change its orientation.

Such a change in the orientation of the scan lens unit 500 results in a change in the incidence position of a laser beam LB relative to an incidence face of the toroidal lens 59. The toroidal lens 59 has a characteristic that when the incidence position of the laser beam LB relative to the incidence face of the toroidal lens 59 is shifted in a direction perpendicular to a long direction of the toroidal lens 59 and a direction of light path from the laser beam LB, an angle at which the laser beam LB is emerged from the toroidal lens 59, that is, an emerging angle of the laser beam LB is changed. With such a characteristic, when the orientation of the scan lens unit 500 is changed by the movement of the up-and-down screw, the emerging angle of the laser beam LB emerged from an emerging face of the toroidal lens 59 is changed accordingly, resulting in a change in the inclination of a scan line on the photoconductor drum.

In the above description, the inclination of the scan line is adjusted by changing the orientation of the toroidal lens 59. It should be noted that the inclination of the scan line may be adjusted by changing the position of the reflective mirror 60. However, the adjustment by changing the position of the scan lens may be preferred when compared to the adjustment by changing the position of the reflective mirror 60 in that the change in the beam spot diameter caused by a change in magnification error and/or light path length may be suppressed to a relatively low level.

Figure 9:
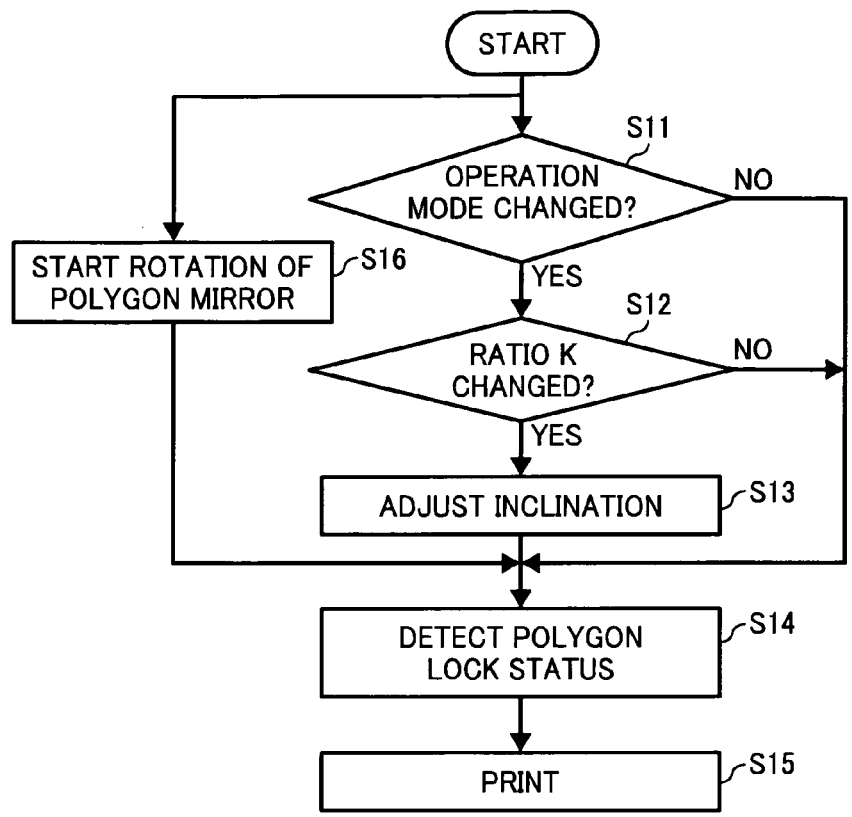
FIG. 9 is a flowchart illustrating a control process of inclination adjustment executed when switching the linear velocity of a photoconductor drum.

FIG. 9 is a flowchart illustrating a control process to adjust the inclination of a scan line when changing the linear velocity.

At S11, it is checked whether or not the operation mode has been changed. If the operation mode has been changed ("YES" at S11), processing proceeds to S12.

At S12, it is checked whether or not the ratio K has been changed. In this regard, the ratio K of each operation mode is determined in advance based on the linear velocity V of each operation mode. Each operation mode and the corresponding ratio K is associated in a table, which is stored in a storage unit. When the operation mode is changed, the table stored in the storage unit is referred to check whether or not the ratio K has been changed. Alternatively, after the operation mode is changed, the ratio K may be calculated from the proportional coefficient γ determined with the optical components.

If the ratio K has been changed ("YES" at S12), processing proceeds to S13. At S13, the inclination adjustment amount α is calculated from the length L of the scan line on the photoconductor drum and the ratio K. Based on the calculated adjustment amount α, the rotation angle of the stepping motor is controlled to automatically adjust the inclination of the scan line.

In this regard, it should be noted that the inclination adjustment amount α may be calculated in advance. In such a case, each operation mode and the corresponding inclination adjustment amount α are associated in a table, which is stored in the storage unit. Thus, when the operation mode is changed, the inclination adjustment amount α may be calculated with reference to the table stored in the storage unit.

Meanwhile, at a given timing, S16, from S11 to S13, driving voltage is applied to the polygon motor.

Until the inclination adjustment of S13 is finished, the rotation speed of the polygon mirror is gradually increased to a rotation speed at which printing is executed. When the inclination adjustment is finished, the polygon mirror is rotated at the constant rotation speed for printing (hereinafter "polygon lock status"), and a lock signal is transmitted to a lock detector.

When the lock detector detects the lock signal at S14, printing is started at S15.

According to the present exemplary embodiment, the polygon motor is started to drive while the inclination adjustment of a scan line is being performed, and thus the downtime before the start of printing may be reduced when compared to a case in which the polygon motor is started to drive after the inclination adjustment is finished. Further, since the inclination adjustment is finished before the polygon mirror enters the polygon lock status, i.e., rotates at the constant speed, the downtime before the start of printing may be further reduced when compared to a case in which the inclination adjustment is finished after the polygon lock.

Furthermore, according to the present exemplary embodiment, when the operation mode is changed and the ratio K is changed accordingly, the inclination adjustment is automatically executed. Therefore, a user does not need to manually perform the inclination adjustment, resulting in a reduction in time and effort of the user compared to a case in which the inclination adjustment is manually performed when the ratio K is changed.

Next, a detailed description is given to the optical scanning unit 50 of the opposed scanning type illustrated in FIGS. 5 and 6.

As illustrated in FIG. 6, optical systems for magenta "M" and black "K" are disposed on the right side of the polygon mirror 57 while optical systems for yellow "Y" and cyan "C" are disposed on the left side of the polygon mirror 57. The optical system for "Y" is structured to be point-symmetric to the optical system for "K" with respect to the rotation shaft of the polygon motor. On the other hand, the optical system for "C" is structured to be point-symmetric to the optical system for "M" with respect to the rotation shaft of the polygon motor.

As illustrated in FIG. 5, the optical scanning unit 50 has light source units 21K, 21M, 21C, and 21Y, serving as light emitters, that emit multiple beams Lk, Lm, Lc, and Ly corresponding to the photoconductor drums 3K, 3M, 3C, 3Y, respectively. Similar to the optical scanning unit of FIG. 1, Each light source unit 21 has a first semiconductor laser 51, a second semiconductor laser 52, and a synthetic prism.

Imaging lenses or cylinder lenses 55K, 55M, 55C, and 55K and reflective mirrors 23a and 23b, which serve as optical elements, are disposed on the light paths of respective light beams from the light source units 21K, 21M, 21C, and 21K to the polygon scanner 57. Further, fθ lenses 59a and 59b, first mirrors 31K, 31M, 31C, and 31Y, second mirrors 32K, 32M, 32C, and 32Y, third mirrors 33K, 33M, 33C, and 33Y, and long lenses 30K, 30M, 30C, and 30Y are disposed on light paths from the polygon scanner 57 to the photoconductor drums 3K, 3M, 3C, and 3Y.

In FIG. 5, the optical scanning unit 50 has a synchronous detection sensor 61MK that detects a light beam Lm for magenta color and a light beam Lk for black color. A synchronous detection sensor 61CY is disposed to point-symmetric to the synchronous detection sensor 61MK with respect to the rotation shaft of the polygon motor.

For example, when a light beam Lk emitted from the light source unit 21K for black color enters the cylinder lens 55K, the cylinder lens 55K corrects an optical face tangle error of the light beam Lk, which may be caused by an inclination between the rotation axis of the polygon mirror and each of reflective faces of the polygon mirror. After passing through the cylinder lens 55K, the light beam Lk is reflected by the reflective mirror 23a toward an acoustic glass 120. The light beam Lk passes through the acoustic glass 120 and enters one side face of an upper polygon mirror 57a. When entering the side face of the upper polygon mirror 57a, the light beam Lk is deflected and scanned in a main-scan-line direction. The light beam or scan beam Lk deflected by the polygon mirror 57a passes through the acoustic glass 120 once more and is conversed by the fθ lens 58a. The light beam Lk converged by the fθ lens 58a is reflected by a return mirror 62MK and is entered into the synchronous detection sensor 61MK. When an synchronous signal is output from the synchronous detection sensor 61K, an output timing of a light-source signal converted based on image data is adjusted in accordance with the synchronous signal.

Similar to the above process, the light beam Lk emitted based on the image data passes through the cylinder lens 55K and is scanned onto the upper polygon mirror 57a to enter the fθ lens 58a. When the light beam Lk entering the fθ lens 58a passes through the toroidal lens 59K, the light beam Lk is directed onto the photoconductor drum 3K via the first through three mirrors 31K, 32K, and 33K.

Similarly, when a first light beam Lm is emitted from the light source unit 21M for magenta color, the first light beam Lm passes through the cylinder lens 55M. The first light beam Lm is reflected by the reflective mirror 23a and is scanned by a lower polygon mirror 57b as illustrated in FIG. 6. When the first light beam Lm scanned by the lower polygon mirror 57b enters the synchronous detection sensor 61MK, the synchronous detection sensor 61MK outputs a synchronous signal. Further, a second light beam Lm based on image data is emitted in accordance with the synchronous signal. As illustrated in FIGS. 5 and 6, the second light beam Lm is directed onto the photoconductor drum 3M via the cylinder lens 55M, the lower polygon mirror 57b, the fθ lens 58a, the first mirror 31M, the toroidal lens 59M, the second mirror 32M, and the third mirror 33M.

Similarly, when a first light beam Lc is emitted from the light source unit 21C for cyan color, the first light beam Lc passes through the cylinder lens 55C. The first light beam Lc is reflected by the reflective mirror 23b and is scanned by the lower polygon mirror 57b as illustrated in FIG. 6. After passing through the fθ lens 58b, the first light beam Lc enters the synchronous detection sensor 61CY, and the synchronous detection sensor 61CY outputs a synchronous signal.

In accordance with the synchronous signal, the light source unit 21C emits a second light beam Lc based on image data. As illustrated in FIGS. 5 and 6, the second light beam Lc is directed onto the photoconductor drum 3C via the cylinder lens 55C, the lower polygon mirror 57b, the fθ lens 58b, the first mirror 31C, the toroidal lens 59C, the second mirror 32C, and the third mirror 33C.

Similarly, when a first light beam Ly is emitted from the light source unit 21Y for yellow color, the first light beam Ly passes through the cylinder lens 55Y. The first light beam Ly is reflected by the reflective mirror 23b and is scanned by the upper polygon mirror 57b as illustrated in FIG. 6. After passing through the fθ lens 58b, the first light beam Ly enters the synchronous detection sensor 61CY, and the synchronous detection sensor 61CY outputs a synchronous signal.

In accordance with the synchronous signal, the light source unit 21Y emits a second light beam Ly based on image data. As illustrated in FIGS. 5 and 6, the second light beam Ly is directed onto the photoconductor drum 3Y via the cylinder lens 55Y, the upper polygon mirror 57a, the fθ lens 58b, the toroidal lens 59Y, the first mirror 31Y, the second mirror 32Y, and the third mirror 33Y.

As described above, the optical scanning unit 50 of the opposed scanning type scans different light beams Lk, Lm, Lc, and Ly across the photoconductor drums 3K, 3C, 3M, and 3K illustrated in FIG. 5 or 6. The optical scanning unit 50 also has scan lens units 500K, 500M, 500C, and 500Y serving as inclination adjustment mechanisms that change positions of the toroidal lenses 59K, 59M, 59C, and 59Y.

Such a configuration allows the inclinations of light beams scanned across the photoconductor drums of respective colors to be adjusted independently of each other. As a result, a direction in which the scan lens unit 500C adjusts the inclination of the light beam Lc and a direction in which the scan lens unit 500Y adjusts the inclination of the light beam Ly become opposite a direction in which the scan lens unit 500K adjusts the inclination of the light beam Lk and a direction in which the scan lens unit 500M adjusts the inclination of the light beam Lm. Thus, as illustrated in FIG. 7B, when a change in the ratio K of the linear velocity V to the scan speed Vimg generates a difference in inclination between scan lines for magenta and black and scan lines for yellow and cyan colors, the scan lines for all colors may be aligned as indicated by dashed lines in FIG. 7B. Accordingly, when yellow, cyan, magenta, and black colors are superimposed one on top of the other to form a full-color image, magenta and black colors are appropriately superimposed on yellow and cyan colors, thereby preventing a color shift in the full-color image.

Alternatively, according to one exemplary embodiment, an optical scanning unit of an opposed scanning type may be constructed to adjust the inclinations of scan lines for yellow, cyan, magenta based on the inclination of a scan line for black. In this case, such scan lens units serving as inclination adjustment mechanisms may be provided to the toroidal lenses 59Y, 59C, and 59M corresponding to the photoconductor drums 3Y, 3C, and 3M, and a scan lens unit may not be provided to the toroidal lens 59K.

As described above, when the inclinations of scan lines for yellow, cyan, and magenta are adjusted based on a scan line for black color, a scan lens unit serving as an inclination adjustment mechanism that shifts the position of the toroidal lens 59K may be omitted, thereby reducing the number of components of the optical scanning unit. Further, such a reduction in the number of components may result in a simplification in system configuration and a reduction in manufacturing cost.

The amount of inclination of a scan line on the photoconductor drum 3M caused by a change in the ratio K of the linear velocity V to the scan speed Vimg is substantially identical to the amount of inclination of a scan line on the photoconductor drum 3K. Therefore, when the inclination adjustment is conducted in accordance with the inclination of the scan line for black and the ratio K of the linear velocity V to the scan speed Vimg, the positions of the toroidal lenses 59Y and 59C for yellow and cyan, which are disposed opposite the toroidal lens 59K for black with respect to the polygon mirror, may be shifted for the inclination adjustment. Thus, an adjustment process for magenta color may be omitted, thereby prolonging the product life of the scan lens unit for magenta.

Further, when the inclination adjustment is conducted based on the inclination of a scan line for black, it may be not necessary to adjust the position of the toroidal lens 59M for magenta. Such a configuration may result in a reduction in the number of components and a simplification in system configuration.

Figure 10:
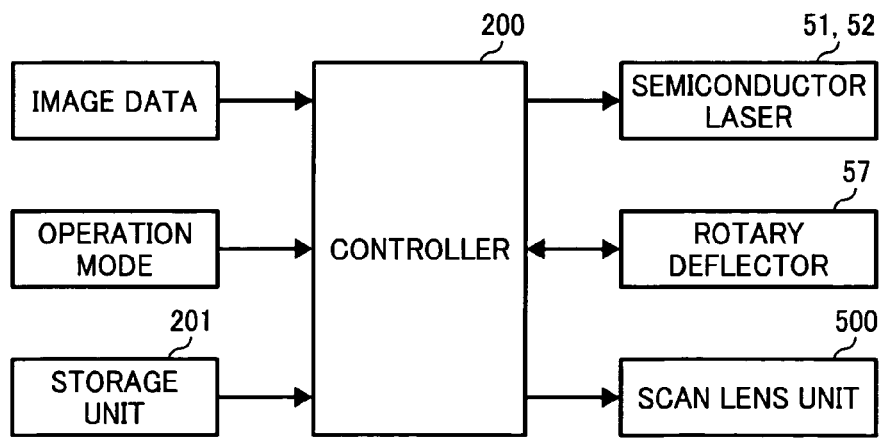
FIG. 10 is a block diagram illustrating a portion of an electric circuit of an optical scanning unit according to exemplary embodiments.

FIG. 10 is a block diagram illustrating a portion of an electric circuit of an optical scanning unit according to one exemplary embodiment.

In FIG. 10, a controller 200 generally controls the optical scanning unit. It should be noted that in FIG. 10 the optical scanning unit is illustrated in a simplified, and various units and sensors, which are not illustrated in FIG. 10, are connected to the controller 200. The controller 200 has a CPU (central processing unit), a ROM (read-only memory), and a RAM (random access memory). Various programs are executed on such hardware components perform functions of various units.

As illustrated in FIG. 10, the controller 200 controls the semiconductor lasers 51 and 52 and the polygon motor and thus controls the rotation speed Rm of the polygon mirror 57 serving as the rotary deflector. In other words, according to the present exemplary embodiment, the controller 200 and the polygon motor serve as a deflector controller that changes the rotation speed of the polygon mirror 57.

Further, the controller 200 controls scan lens units, serving as inclination adjustment mechanism, to adjust the inclinations of scan lines on the photoconductor drums 3. For example, in the optical scanning unit of an opposed scanning type illustrated in FIGS. 5 and 6, the controller 200 controls the scan lens units for the four colors independently of each other. In such a configuration, the scan lines different in the direction of inclination, which may be caused by a change in the ratio K, become adjustable independently of each other. Thus, according to the exemplary embodiment, the controller 200 serves as a controller to control inclination adjustment units of the scan lens units.

A storage unit 201 stores, for example, rotation speeds Rm of the rotary deflector 75 and adjustment amounts a of inclination for respective operation modes. Based on a specified operation mode, the controller 200 picks up a corresponding rotation speed Rm and adjustment amount α of inclination from the storage unit 201. Based on the rotation speed Rm and adjustment amount α of inclination picked-up form the storage unit 201, the controller 200 controls the polygon motor and the scan lens units.

Next, image forming apparatuses according to exemplary embodiments are described with reference to FIGS. 11 and 12.

Figure 11:
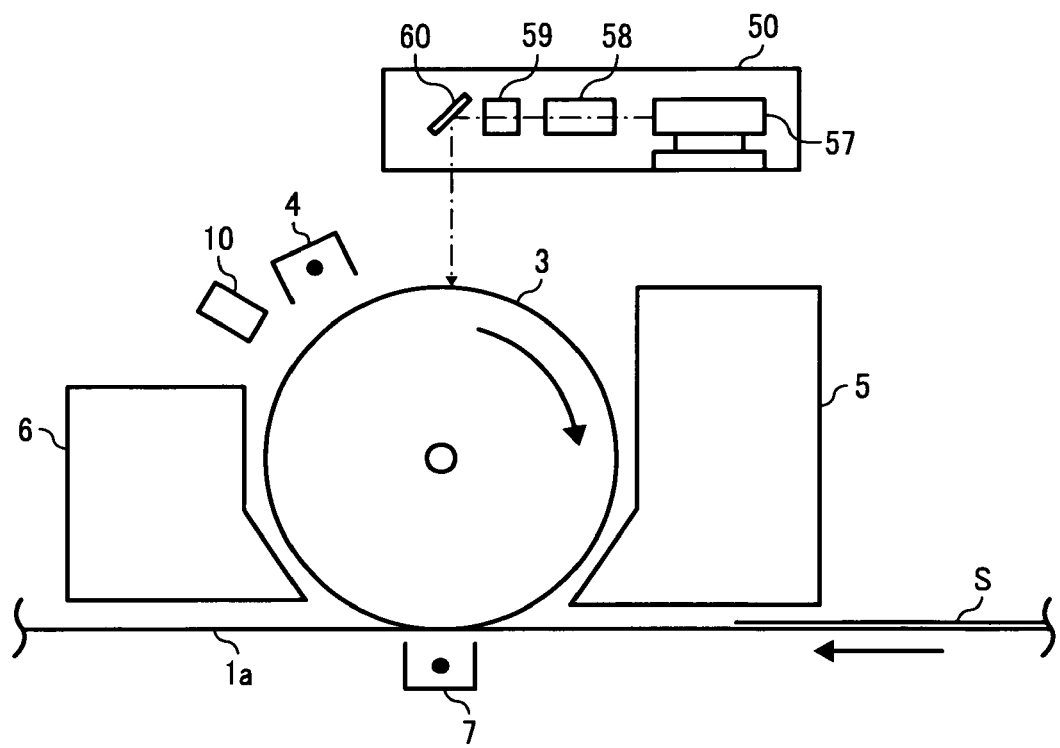
FIG. 11 is a schematic view illustrating a configuration of an imaging unit and its neighboring portion in a monochrome image forming apparatus according to one exemplary embodiment.

FIG. 11 is a schematic view illustrating a configuration of an imaging unit and its neighboring portion in a monochrome image forming apparatus. In FIG. 11, a photoconductor drum 3 serving as an image carrier is surrounded by a charger 4, a developing unit 5, a cleaning unit 6, a transfer unit 7, a discharger 10. An optical scanning unit 50 is disposed above the photoconductor drum 3. The optical scanning unit 50 of FIG. 11 has a similar, if not the same, configuration to that of FIG. 1, and has a polygon mirror 57, an fθ lens 58, a toroidal lens 59, and a reflective mirror 60. Further, similar to FIG. 1, the optical scanning unit 50 also has first and second semiconductor lasers forming part of a multi-beam light source unit, a synthetic prism, and other components, which are not illustrated in FIG. 11.

In the monochrome image forming apparatus thus configured, the charger 4 uniformly charges the surface of the photoconductor drum 3 at an electric potential.

In the optical scanning unit 50, a laser diode is driven based on image data transmitted from a host machine, such as a personal computer, so as to emit a light beam toward the polygon mirror 57. The light beam is directed onto the photoconductor drum 3 through a cylinder lens or other optical elements to form an electrostatic latent image on the photoconductor drum 3. The developing unit 5 supplies toner onto the electrostatic latent image to visualize the electrostatic latent image as a toner image.

A sheet S fed by a sheet feeder is forwarded by resist rollers at a timing suitable for the toner image on the photoconductor drum 3. The sheet S is attracted onto the transfer conveyance belt 1a and is conveyed to a transfer point at which the photoconductor drum 3 and a transfer unit 7 face each other. The toner image on the photoconductor drum 3 is transferred onto the sheet S at the transfer point.

The sheet S having the toner image is forwarded to a fixing unit, not illustrated. The fixing unit fixes the toner image on the sheet S, and the sheet S is discharged from the image forming apparatus.

After the transfer of the toner image, the discharger 10 removes residual potential remaining on the photoconductor drum 3 to prepare for the next image formation.

The monochrome image forming apparatus according to the present exemplary embodiment has a configuration capable of changing or switching the linear velocity of the photoconductor drum 3. For example, the monochrome image forming apparatus may have the respective operation modes of the PATTERNS A, B and E in TABLE 2 described above.

When switching the linear velocity, the optical scanning unit 50 is controlled in a similar or the same manner as described for the optical scanning unit 50 of FIG. 1. Such control facilitates the rotation speed of the polygon mirror 57 to have a relatively narrow range, and thus the rotary deflector and the polygon motor for driving the rotary deflector may be operated in more favorable conditions.

Similar to the optical scanning unit 50 of FIG. 1, the optical scanning unit 50 of FIG. 11 is capable of scanning with a doubled density, scanning every other face of the reflective faces, or performing control operations as described in TABLE 3.

In PATTERN A or B using a reduced number of light sources N, the position of the toroidal lens 59 is changed in accordance with the inclination amount α of a scan line calculated based on the ratio K of the linear velocity V to the scan speed Vimg to adjust the inclination of the scan line.

Next, a color image forming apparatus according to one exemplary embodiment is described with reference to FIG. 12.

Figure 12:
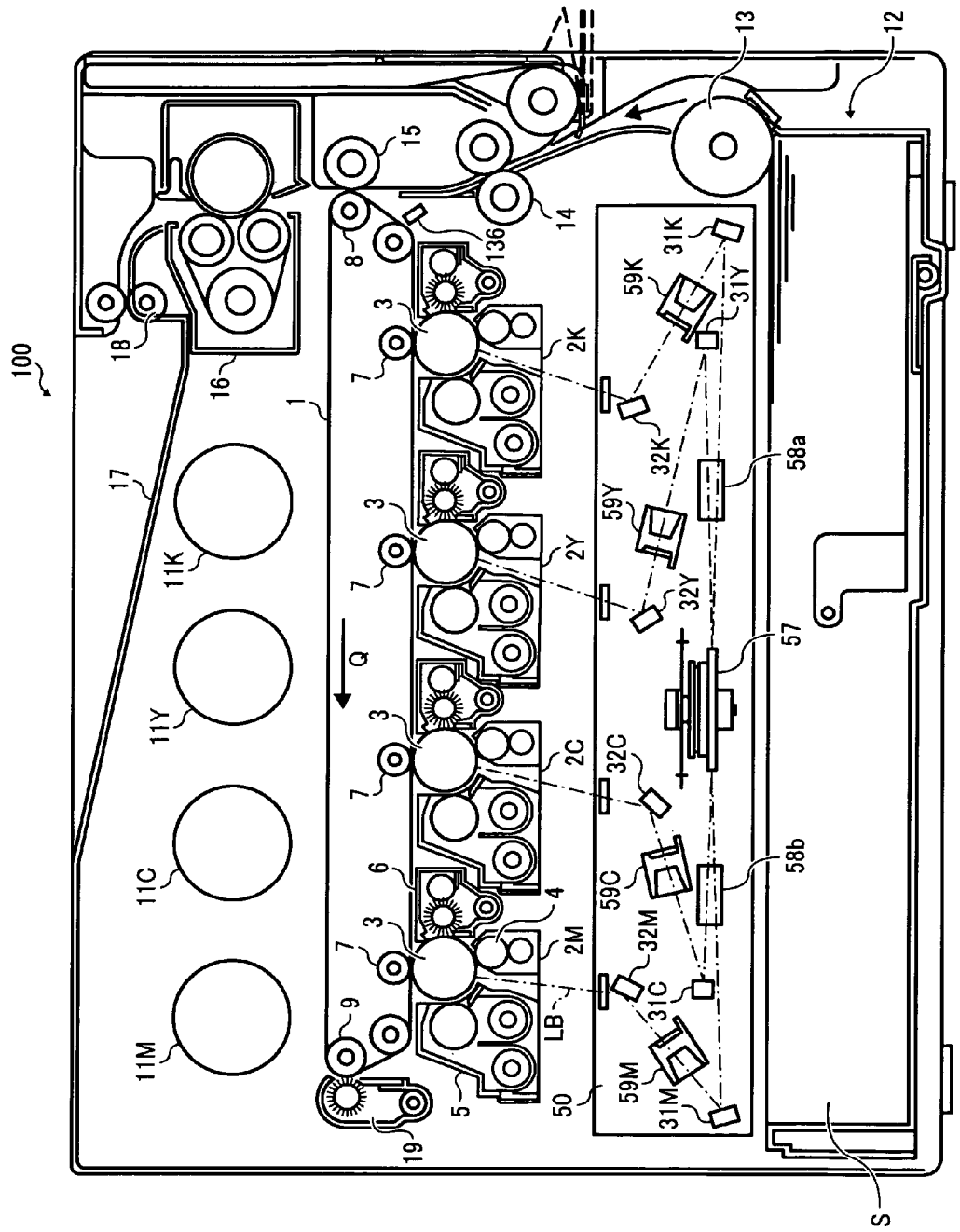
FIG. 12 is a cross-sectional view illustrating a configuration of a full-color printer configured as a color image forming apparatus having an optical scanning unit according to one exemplary embodiment.

FIG. 12 is a cross-sectional view illustrating a color image forming apparatus 100 configured as a tandem-type full-color printer in which a plurality of imaging units are arranged side by side.

As illustrated in FIG. 12, in the color image forming apparatus 100, four imaging units 2M, 2C, 2Y, and 2K for magenta, cyan, yellow, and black, respectively, are disposed side by side along a lower running surface of an intermediate transfer belt 1. Below the four imaging units 2M, 2C, 2Y and 2K are provided an optical scanning unit 50 of the opposed scanning type illustrated in FIG. 5 or 6.

Further below the optical scanning unit 50 of the opposed scanning type is provided a sheet feed cassette 12. At one end portion of the sheet feed cassette 12 is disposed a sheet feeder 13 that feeds a recording sheet S, such as a transfer paper sheet, stored in the sheet feed cassette 12.

Above the sheet feeder 13 are provided resist rollers 14. Further, above the resist rollers 14 is disposed a transfer roller 15 serving as a secondary transfer mechanism. A fixing unit 16 is disposed above a secondary transfer portion at which the transfer roller 15 is in contact with the intermediate transfer belt 1 with pressure.

An upper surface of the color image forming apparatus 100 is structured as a catch tray 17 and is provided with sheet discharge rollers 18 that discharge the recording sheet S after a toner image is fixed thereon. Toner bottles 11M, 11C, 11Y, 11K for storing toner of respective colors are also provided at an upper portion of the color image forming apparatus 100.

The structure and operations of the imaging units 2M, 2C, 2Y and 2K are substantially identical except for the difference in the toner colors of magenta (M), cyan (C), yellow (Y) and black (K). Therefore, the imaging unit 2M, which is disposed at a left end portion of the full color printer in FIG. 12, is described below as an example of the imaging units. Incidentally, reference characters that denote the toner colors are omitted herein.

The imaging unit 2 has a photoconductor drum 3 serving as an image carrier. The photoconductor drum 3 is rotationally driven by a driving unit in a clockwise direction in FIG. 12.

Around the photoconductor drum 3 are disposed a charging roller 4, a developing unit 5, and a cleaning unit 6, for example. The developing unit 5 may be a two-component developing unit using toner and carrier. The developing unit carries toner by a developing sleeve to supply the toner to the photoconductor drum 3.

A transfer roller 7 serving as a primary transfer mechanism is disposed opposite to the photoconductor drum 3 with the intermediate transfer belt 1 interposed therebetween.

The intermediate transfer belt 1 serving as a transfer member is spanned between a plurality of support rollers and is rotationally driven in a counterclockwise direction indicated by an arrow Q in FIG. 12. One of the support rollers is a counter roller 8 disposed facing the secondary transfer roller 15.

On the other end portion of the intermediate transfer belt 1, that is, the side opposite the side of the counter roller 8, is disposed a support roller 9. A belt cleaning unit 19 is disposed facing the supporting roller 9 with the intermediate transfer belt 1 interposed therebetween. The belt cleaning unit 19 is in contact with the intermediate transfer belt 1 with pressure.

The optical scanning unit 50 has a configuration capable of directing light beams onto the four imaging units 2M, 2C, 2Y and 2K. The optical scanning unit 50 of FIG. 12 is basically similar to, if not the same as, the optical scanning unit 50 illustrated in FIG. 5 or 6. The optical scanning unit 50 has a polygon mirror 57 serving as a rotary deflector, fθ lenses 58a and 58b, toroidal lenses 59, first mirrors 31, and second mirrors 32.

Next, a printing operation of the color image forming apparatus 100 thus configured is described.

In the imaging unit 2M for magenta, the surface of the photoconductor drum 3 is uniformly charged at a predetermined or given potential by the charging roller 4.

In the optical scanning unit 50, laser diodes are driven so as to emit a laser beam toward the polygon mirror 27 based on image data transmitted from a host machine such as a personal computer. The laser beam is directed onto the photoconductor drum 3M via a cylinder lens and so forth. Thus, an electrostatic latent image to be developed with magenta toner is formed on the photoconductor drum 3. The developing unit 5 supplies toner to the latent image to form a visible image of magenta toner.

Similar to the imaging unit 2M for magenta color, in the other imaging units 2C, 2Y, and 2K, visible images of respective toner colors are formed on surfaces of corresponding photoconductor drums 3. Then, the visible images of respective colors are transferred on the intermediate transfer belt 1 in a superimposed manner.

Meanwhile, a sheet designated as a transfer material is fed from the sheet feeder 12 and is conveyed to abut against a pair of registration rollers 14 disposed on an upstream side of the direction in which the sheet is conveyed. In synchronous with the movement of the toner image on the photoconductor drum 3, the sheet is conveyed to a secondary transfer point at which the secondary transfer roller 15 is in contact with the intermediate transfer paper 1 with pressure. Thus, the toner image is transferred on the sheet by action of the secondary transfer roller 15.

In a case of monochrome printing, a visible image of black toner is formed on a surface of the photoconductor drum 3 in the imaging unit 2K for black color and is transferred on the sheet.

The fixing unit 16 fixes the toner image on the sheet, and the sheet having the fixed image is discharged to the catch tray 17 provided at the upper surface of the printer. At this time, the sheet is turned over and is discharged to the catch tray 17 with its back face facing up. Such sheet discharge allows printed sheets to be stacked in a page order.

The color image forming apparatus according to the present exemplary embodiment has a configuration capable of changing or switching the linear velocity of the photoconductor drum. For example, the color image forming apparatus may have the respective operation modes of the PATTERNS A through E in TABLE 2 described above.

When switching the linear velocity, the optical scanning unit 50 is controlled in a similar manner to that described with reference to the optical scanning unit 50 of FIG. 1. Such control facilitates the rotation speed of the polygon mirror 57 to have a relatively narrow range, and thus the rotary deflector and the polygon motor for driving the rotary deflector may be operated in more favorable conditions.

Similar to the optical scanning unit 50 of FIG. 1, the optical scanning unit 50 is capable of performing double density scan, scanning every other face of the reflective faces, or performing control operations as described with reference to TABLE 3.

When the ratio K of the linear velocity V to the scan speed Vimg is changed, the position of the toroidal lens 59 is changed to adjust the inclination of the scan line, thereby preventing a color shift in a resultant toner image.

Figure 13:
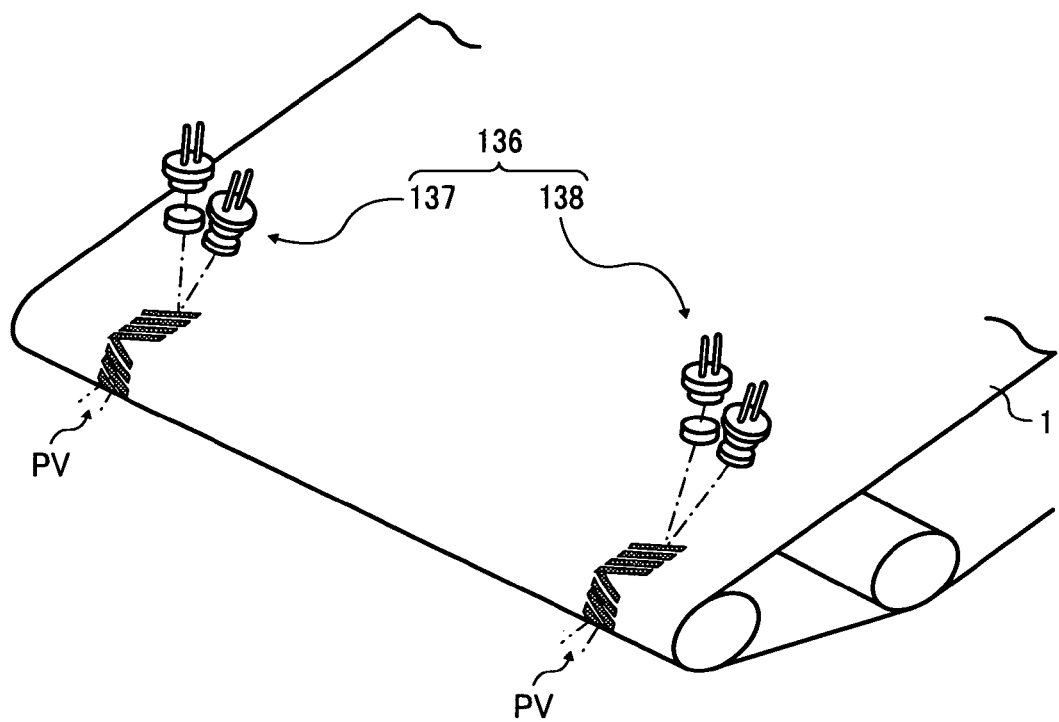
FIG. 13 is a schematic view illustrating an optical sensor unit and a portion of an intermediate transfer belt in the color image forming apparatus of FIG. 12.

As illustrated in FIG. 13, the color image forming apparatus has an optical sensor unit 136 in which two reflective photosensors described later are arranged with a certain distance in a width direction of the intermediate transfer belt 1. Each of the photosensor unit 137 and 138 is disposed facing the intermediate transfer belt 1 with a certain distance.

Generally, in an image forming apparatus, a scan line may be inclined due to its internal temperature change, temporal change, and/or change of its ambient environment. For example, when printing operation is continuously performed, the internal temperature of such an image forming apparatus may increase and deform a component member with heat, resulting in an inclination of a scan line.

Hence, the color image forming apparatus according to the present exemplary embodiment corrects an inclination of a scan line by performing adjustment control at a certain timing, for example, just after the power is turned on, when every two hundred sheets are continuously printed, and/or when its internal temperature increases by five degrees or more.

The image forming-apparatus has a controller 200 as illustrated in FIG. 10 to perform control operation to adjust an inclination of a scan line at a certain timing as described above. In such inclination adjustment control, a pattern image PV for inclination adjustment is formed on each end portion in the width direction of the intermediate transfer belt 1. Each pattern image PV has a plurality of toner marks.

As described above, above the intermediate transfer belt 1 is disposed the optical sensor unit 136 having the first optical sensor 137 and the second optical sensor 138. Each of the optical sensors 137 and 138 has a light emitter, a conversion lens, and a light receiver. For example, the first optical sensor 137 emits a light beam from the light emitter toward a conversion lens. When passing through the conversion lens, the light beam is reflected on a surface of the intermediate transfer belt 1 and is received by the light receiver. The first optical sensor 137 outputs a voltage in accordance with the light intensity received by the light receiver.

When toner marks of a pattern image PV for inclination adjustment formed on one end portion of the intermediate transfer belt 1 pass through below the first optical sensor 137, the light intensity received by the light receiver significantly changes. Thus, the first optical sensor 137 detects the toner marks and changes voltages output from the light receiver accordingly. Similarly, the second optical sensor 138 detects respective toner marks of a pattern image PV for inclination adjustment formed on another end portion of the intermediate transfer belt 1.

Thus, each of the first optical sensor 137 and the second optical sensor 138 serves as a detector to detect respective toner marks of a pattern image PV for inclination adjustment of a scan line.

In this regard, the light emitter may be, for example, a LED (light-emitting diode) having a light intensity capable of generating a reflection light needed to detect the toner marks. The light receiver may be, for example, a CCD (charge-coupled device) in which a large number of light light-receiving elements are arrayed in a straight line.

As described above, the respective toner marks of the pattern images PV formed on both end portions in the width direction of the intermediate transfer belt 1 are detected and thus the amount of relative shift between a pattern image PV for black color and each of pattern images PV for yellow, cyan, and magenta colors are obtained. Further, the inclination amount of a scan line for each of yellow, cyan, and magenta colors relative to a scan line for black color is calculated to minimize the amount of relative shift, and the calculated results are output to the controller 200 illustrated in FIG. 10.

Based on the calculation results, the controller 200 controls rotation angles of the stepping motors 506 in the scan lens units 500 for yellow, cyan, and magenta. As a result, the positions of the toroidal lenses for yellow, cyan, and magenta are changed to adjust the inclinations of the scan lines on the photoconductor drums 3 for yellow, cyan, and magenta.

Such inclination adjustment control may be executed on the linear velocity V of each operation mode, for example, each of PATTERNS A through E, so that the inclination amount α in each linear velocity V is calculated. Alternatively, the inclination adjustment control may be executed on the linear velocity V of the default operation mode, for example, PATTERN E, so that the inclination amount α in the linear velocity V of the default operation mode is calculated.

Then, based on the calculated result, the inclination amounts in the other operation modes may be calculated.

In the latter case, pattern images PV for inclination adjustment are formed at one linear velocity. Therefore, the time needed for the inclination adjustment control becomes relatively short compared to the former case. Further, in the latter case, the number of pattern images PV formed on the intermediate transfer belt 1 is relatively small compared to the former case, thereby resulting in a reduction in the toner amount used in the inclination adjustment control.

In the above description, example embodiments of the present invention are described with reference to the drawings. It should be noted that example embodiments of the present invention are not limited to the above described exemplary embodiments.

For example, the threshold value for regulating the optical scanning unit is not limited to 75 percent of the maximum linear velocity described above. The threshold value may be set to any other appropriate value.

The number of light sources of the optical scanning unit is not limited to two and may be three or more. The number of reflective faces of the rotary deflector is not limited to six and may be any suitable number. Furthermore, the configuration of each portion of the optical scanning unit may be modified as needed.

The number of operation modes of the linear velocity is not limited to five and may be any suitable number. The linear velocity and pixel density of each operation mode or pattern may be any suitable value as needed.

In an image forming apparatus having an optical scanning unit according to exemplary embodiments, an imaging unit may have any suitable configuration, and the optical scanning unit may have any suitable configuration so that a scan light beam is directed onto an image carrier in the imaging unit.

The image forming apparatus is not limited to a printer as described above and may be a copier, a facsimile machine, or a multi-function device having a plurality of functions thereof.

For the optical scanning unit according to the above-described exemplary embodiments, the inclination of a scan line on the photoconductor drum is adjusted in accordance with the ratio K of the scan speed Vimg of a light beam scanned on a surface of the photoconductor drum, serving as a latent image carrier, to the linear velocity V of the photoconductor drum. Such adjustment may prevent an inclination of the scan line that may be generated when the ratio K of the linear velocity V to the scan speed Vimg is changed.

Further, the optical scanning unit is capable of precisely and easily changing the position of each toroidal lens using the corresponding stepping motor, and is thus capable of precisely and easily adjusting the inclination of a scan line.

In the optical scanning unit, each toroidal lens is configured to be swingable on a plane perpendicular a scan plane to adjust the inclination of a scan line. In such a configuration, a change in magnification error when changing the position of the toroidal lens or a change in the diameter of a beam spot with a change in the light path of a light beam may be relatively reduced, compared to a configuration in which the inclination is adjusted by a reflective mirror. As a result, the optical scanning unit is capable of producing an excellent image after performing the inclination adjustment.

The optical scanning unit also has a configuration capable of separately correcting the inclinations of scan lines on the photoconductor drums for the respective colors. Such a configuration allows the inclinations of scan lines on the respective photoconductor drums to be appropriately corrected when the inclinations of the scan lines are different between the photoconductor drums.

When the scan direction of a light beam on each of the photoconductor drums for yellow and cyan colors is opposite a scan direction of a light beam on each o the photoconductor drums for black and magenta, the inclination adjustment by changing the ratios K on yellow and cyan is performed in a direction opposite a direction of the inclination of a scan line on each of the photoconductor drums for black and magenta. Such a configuration may prevent a relative shift between different colors that may be generated after the inclination adjustment by changing the ratios K.

Alternatively, the optical scanning unit may be configured so that the inclinations of scan lines on the photoconductor drums for yellow, cyan, and magenta are adjust in accordance with the inclination of a scan line on the photoconductor drum for black. Such a configuration may reduce the number of components, resulting in a cost reduction of the optical scanning unit.

Alternatively, when the optical scanning unit is the opposed scanning type described above, the inclination adjustment by changing the ratio K is performed on scan lines for yellow and cyan colors, which scan in a direction opposite a scan direction of a scan line for black color, to suppress a relative shift between different colors.

For example, when the linear velocity of a photoconductor drum is reduced from its maximum linear velocity Vmax to V (Vmax>V), the rotation speed Rm of a polygon motor is reduced to Rdef×(V/Vmax) if V/Vmax is larger than a predetermined value. Further, if V/Vmax is lower than a predetermined value, the number of light beams emitted from the light sources is reduced to Ndef/m, where m is a positive integer, and the rotation speed Rm of the polygon motor is reduced to Rdef×(V/Vmax)×m.

Thus, the rate of reduction of the rotation speed of the polygon motor may become relatively small compared to the rate of reduction of the linear velocity of the photoconductor. As a result, when performing image formation at a reduced linear velocity V, the polygon motor is operated within a preferable range of the rotation speed. Such a configuration may suppress low-frequency jitter or uneven rotation of the polygon mirror, thereby producing a preferable image.

According to one exemplary embodiment, the optical scanning unit may be used in an image forming apparatus having a photoconductor drum that serves as an image carrier, a developing unit that develops a latent image formed on the photoconductor drum, a transfer unit that transfers a visual image, developed on the photoconductor drum, onto a transfer material. Thus, when changing the ratio K of the linear velocity V to the scan speed Vimg, the image forming apparatus is capable of producing an excellent image while suppressing the inclination of scan lines.

Alternatively, according to one exemplary embodiment, the optical scanning unit may be used in an image forming apparatus having a plurality of photoconductor drums that serve as image carriers, a plurality of developing units that separately develop latent images formed on the corresponding photoconductor drums, a plurality of transfer units that transfer and superimpose visual images, developed on the corresponding photoconductor drums, onto a transfer material. Thus, when changing the ratio K of the linear velocity V to the scan speed Vimg, the image forming apparatus is capable of producing an excellent image while suppressing a color shift therein.

Further, in the image forming apparatus, the inclination adjustment of a scan line may be finished after switching the linear velocity of a photoconductor drum and before forming the latent image on the surface of the photoconductor drum, thereby preventing the scan line from being inclined due to a change in the ratio K.

Particularly, when the inclination adjustment of a scan line is finished before the polygon mirror starts the rotation for forming a latent image, the downtime until the start of printing may be reduced compared to the case in which the inclination adjustment of a scan line is finished after the polygon mirror reaches a rotation speed at which a latent image is formed.

The amount of the inclination adjustment on each linear velocity of a photoconductor drum is calculated based on the positional information of toner marks of a pattern image for inclination adjustment. The pattern image is formed on an intermediate transfer belt while rotating the photoconductor drum at a reference linear velocity, and is detected by an optical sensor unit to obtain the positional information. Further, when such pattern images for inclination adjustment are formed at respective linear velocities of the photoconductor drum, the time needed to control the inclination adjustment may be shortened compared to the case in which the amounts of inclination adjustment at the respective linear velocities are separately calculated. Further, the number of pattern images for inclination adjustment decreases, resulting in a reduction in the amount of toner used in the inclination adjustment control.

Exemplary embodiments of the present invention may be conveniently implemented using a conventional general purpose digital computer programmed according to the teachings of the present specification, as will be apparent to those skilled in the computer art. Appropriate software coding can readily be prepared by skilled programmers based on the teachings of the present invention, as will be apparent to those skilled in the software art. Exemplary embodiments of the present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that, within the scope of the appended claims, the disclosure of this application may be practiced otherwise than as specifically described herein.

Further, elements and/or features of different exemplary embodiments and/or examples may be combined with each other and/or substituted for each other within the scope of this disclosure and appended claims.

Still further, any one of the above-described and other exemplary features of the present invention may be embodied in the form of an apparatus, method, system, computer program, or computer program product. For example, the aforementioned methods may be embodied in the form of a system or device, including, but not limited to, any of the structures for performing the methodology illustrated in the drawings.

Even further, any of the aforementioned methods may be embodied in the form of a program. The program may be stored on a computer readable medium and configured to perform any one of the aforementioned methods when run on a computer device (a device including a processor). Thus, the storage medium or computer readable medium can be configured to store information and interact with a data processing facility or computer device to perform the method of any of the above-described embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media (such as CD-ROMs and DVDs), magneto-optical storage media (such as MOs), magnetic storage media (including but not limited to floppy diskettes, cassette tapes, and removable hard disks), media with a built-in rewriteable non-volatile memory (including but not limited to memory cards), and media with a built-in ROM (including but not limited to ROM cassettes), etc. Furthermore, various information regarding stored images, for example, property information, may be stored in any other form, or provided in other ways.

Examples and embodiments being thus described, it should be apparent to one skilled in the art after reading this disclosure that the examples and embodiments may be varied in many ways. Such variations are not to be regarded as a departure from the spirit and scope of the present invention, and such modifications are not excluded from the scope of the following claims.

What is claimed is:

1. An optical scanning unit included in an image forming apparatus having at least one latent image carrier, the optical scanning apparatus comprising:
    at least one light emitter to emit a light beam;
    a rotary deflector to deflect and scan the light beam, said light beam emitted from the at least one light emitter, onto a surface of the at least one latent image carrier; and
    at least one inclination adjustment unit to adjust an inclination of a scan line corresponding to the light beam relative to a reference scan line on the at least one latent image carrier,
        wherein a controller is included in the image forming apparatus and is externally connected to the optical scanning unit, the controller being configured to change at least one of a linear velocity of the at least one latent image carrier and a rotation speed of the rotary deflector so as to change a ratio between the linear velocity of the at least one latent image carrier and a scan speed of the light beam for scanning the surface of the at least one latent image carrier, and
        the controller controlling the at least one inclination adjustment unit based on the ratio between the scan speed of the light beam and the linear velocity of the at least one latent image carrier to keep the scan line from inclining relative to the reference scan line,
    wherein the inclination of the scan line is adjusted by controlling a rotational angle of a stepping motor in the at least one inclination adjustment unit in accordance with the ratio of the linear velocity of the at least one latent image carrier and the scan speed of the light beam for scanning the surface of the at least one latent image carrier, and
    when the rotational angle of the stepping motor is controlled based on an obtained inclination adjustment amount, an up-and-down screw mounted on a rotation shaft of the stepping motor moves up and down, and one end portion of inclination adjustment unit on a side of the stepping motor is moved.

2. The optical scanning unit according to claim 1, wherein the controller controls the inclination adjustment unit based on an inclination adjustment amount that is calculated from the ratio between the scan speed of the light beam and the linear velocity of the at least one latent image carrier to adjust the inclination of the scan line.

3. The optical scanning unit according to claim 2, further comprising:
an optical element in an optical path of the light beam from the rotary deflector to the surface of the at least one latent image carrier,
wherein the inclination adjustment unit includes a stepping motor, and a rotation angle of the stepping motor is controlled based on the inclination adjustment amount to change an orientation of the optical element relative to the light beam.

4. The optical scanning unit according to claim 3, wherein the optical element is a scan lens rotatably supported on a plane perpendicular a scan plane.

5. The optical scanning unit according to claim 1, wherein the optical scanning unit includes a plurality of light emitters and a plurality of inclination adjustment units,
wherein the image forming apparatus includes a plurality of latent image carriers,
wherein the rotary deflector separately deflects respective light beams emitted from the plurality of light emitters and scans the respective light beams as scan lines across surfaces of the plurality of latent image carriers; and
wherein the plurality of inclination adjustment units separately adjust respective inclinations of the scan lines on the plurality of latent image carriers.

6. The optical scanning unit according to claim 5,
wherein the optical scanning unit uses a first light beam emitted from a first light emitter of the plurality of light emitters to scan a surface of a first latent image carrier of the plurality of latent image carriers as a first scan line and uses a second light beam emitted from a second light emitter of the plurality of light emitters to scan a surface of a second latent image carrier of the plurality of latent image carriers as a second scan line, and the first scan line and the second scan line are scanned in opposite directions, and
wherein a first inclination adjustment unit of the plurality of inclination adjustment units adjusts an inclination of the first scan line and a second inclination adjustment unit of the plurality of inclination adjustment units adjusts an inclination of the second scan line, and the first scan line and the second scan line are adjusted in opposite directions.

7. The optical scanning unit according to claim 6, wherein the second inclination adjustment unit of the plurality of inclination adjustment units adjusts an inclination of the second scan line based on the first scan line scanned on the first latent image carrier of the plurality of latent image carriers.

8. The optical scanning unit according to claim 7,
wherein the second inclination adjustment unit of the plurality of inclination adjustment units adjusts an inclination of the second scan line based on the first scan line scanned on the first latent image carrier of the plurality of latent image carriers using a ratio between a linear velocity of the second latent image carrier of the plurality of latent image carriers and a scan speed of the second scan line while the first scan line used as a reference scan line for the second scan line is not adjusted by the first inclination adjustment unit of the plurality of inclination adjustment units.

9. The optical scanning unit according to claim 1, wherein the controller changes a rotation speed of either the rotary deflector or the rotation speed of the rotary deflector and the number of light beams emitted from the at least one light emitter in accordance with a change in the linear velocity of the at least one latent image carrier,
wherein, when reducing the linear velocity of the at least one latent image carrier from Vmax to V in a range satisfying a relation of Vmax>V, the controller reduces the rotation speed Rm of the rotary deflector to Rdef× (V/Vmax), if V/Vmax is larger than a certain value, and the controller reduces the number of light beams emitted from the light emitters to a value of Ndef/m, m is a positive integer, and the rotation speed Rm of the rotary deflector is reduced to Rdef×(V/Vmax)×m if V/Vmax is equal to or less than the certain value, where Vmax represents a maximum linear velocity of the at least one latent image carrier, Ndef represents the number of light beams emitted from the light emitter at the maximum linear velocity Vmax, and Rdef represents the rotation speed of the rotary deflector thereat.

10. An image forming apparatus, comprising:
at least one latent image carrier to carry a latent image;
an optical scanning unit to write the latent image on a surface of the at least one latent image carrier;
at least one developing unit to develop the latent image written on the at least one latent image carrier to form a visible image on the at least one latent image carrier;
a transfer unit to transfer the visible image formed on the at least one latent image carrier to a transfer member; and
a controller configured to change at least one of a linear velocity of the at least one latent image carrier and a rotation speed of a rotary deflector so as to change a ratio between the linear velocity of the at least one latent image carrier and a scan speed of the light beam for scanning the surface of the at least one latent image carrier,
the controller controlling at least one inclination adjustment unit based on the ratio between the scan speed of the light beam and the linear velocity of the at least one latent image carrier to keep the scan line from inclining relative to the reference scan line,
wherein the inclination of the scan line is adjusted by controlling a rotational angle of a stepping motor in the at least one inclination adjustment unit in accordance with the ratio of the linear velocity of the at least one latent image carrier and the scan speed of the light beam for scanning the surface of the at least one latent image carrier, and
when the rotational angle of the stepping motor is controlled based on an obtained inclination adjustment amount, an up-and-down screw mounted on a rotation shaft of the stepping motor moves up and down, and one end portion of inclination adjustment unit on a side of the stepping motor is moved, wherein
the optical scanning unit includes,
at least one light emitter to emit a light beam;
the rotary deflector to deflect and scan the light beam, emitted from the at least one light emitter, onto the surface of the at least one latent image carrier; and
the at least one inclination adjustment unit to adjust an inclination of a scan line corresponding to the light beam relative to a reference scan line on the at least one latent image carrier.

11. The image forming apparatus according to claim 10, wherein the image forming apparatus includes,
a plurality of latent image carriers;
a plurality of developing units, the plurality of developing units separately developing respective latent images formed on the plurality of latent image carriers to form visible images on the plurality of latent image carriers; and the transfer unit to transfer and superimpose the visible images formed on the plurality of latent image carriers onto the transfer member.

12. The image forming apparatus according to claim 10, wherein the inclination adjustment unit adjusts the inclination of the scan line scanned across the at least one latent image carrier within a period of time from when the controller changes the linear velocity of the at least one latent image carrier to when the latent image is formed on the surface of the at least one latent image carrier.

13. The image forming apparatus according to claim 12, wherein the inclination adjustment unit adjusts the inclination of the scan line scanned on the at least one latent image carrier within a period of time from when the controller changes the linear velocity of the at least one latent image carrier to when the rotary deflector reaches a rotation speed at which the latent image is formed on the at least one latent image carrier.

14. The image forming apparatus according to claim 13, further comprising:
an optical sensor configured to detect toner marks that are formed on the at least one latent image carrier or the transfer member while the at least one latent image carrier is being rotated at a reference linear velocity,
wherein the inclination adjustment unit calculates inclination adjustment amounts for respective linear velocities of the at least one latent image carrier based on positions of the toner marks detected by the optical sensor.

15. The image forming apparatus according to claim 10, wherein the optical scanning unit includes an optical element in an optical path of the light beam from the rotary deflector to the surface of the at least one latent image carrier,
wherein the at least one inclination adjustment unit includes a stepping motor, and a rotation angle of the stepping motor is controlled based on the inclination adjustment amount to change an orientation of the optical element relative to the light beam.

16. The image forming apparatus according to claim 15, wherein the optical element is a scan lens rotatably supported on a plane perpendicular a scan plane.

17. The image forming apparatus according to claim 10, wherein the optical scanning unit includes a plurality of light emitters, a plurality of inclination adjustment units, and a plurality of latent image carriers,
wherein the rotary deflector separately deflects respective light beams emitted from the plurality of light emitters and scans the respective light beams as scan lines across surfaces of the plurality of latent image carriers; and
wherein the plurality of inclination adjustment units separately adjusts respective inclinations of the scan lines on the plurality of latent image carriers.

18. The image forming apparatus according to claim 17, wherein the optical scanning unit uses a first light beam emitted from a first light emitter of the plurality of light emitters to scan a surface of a first latent image carrier of the plurality of latent image carriers as a first scan line and uses a second light beam emitted from a second light emitter of the plurality of light emitters to scan a surface of a second latent image carrier of the plurality of latent image carriers as a second scan line, and the first scan line and the second scan line are scanned in opposite directions, and
wherein a first inclination adjustment unit of the plurality of inclination adjustment units adjusts an inclination of the first scan line and a second inclination adjustment unit of the plurality of inclination adjustment units adjusts an inclination of the second scan line, and the first scan line and the second scan line are adjusted in opposite directions.

19. The image forming apparatus according to claim 18, wherein the second inclination adjustment unit of the plurality of inclination adjustment units adjusts an inclination of the second scan line based on the first scan line scanned on the first latent image carrier of the plurality of latent image carriers.

20. The image forming apparatus according to claim 19, wherein the second inclination adjustment unit of the plurality of inclination adjustment units adjusts an inclination of the second scan line based on the first scan line scanned on the first latent image carrier of the plurality of latent image carriers using a ratio between a linear velocity of the second latent image carrier of the plurality of latent image carriers and a scan speed of the second scan line while the first scan line used as a reference scan line for the second scan line is not adjusted by the first inclination adjustment unit of the plurality of inclination adjustment units.

21. The image forming apparatus according to claim 10, wherein the controller changes a rotation speed of either the rotary deflector or the rotation speed of the rotary deflector and the number of light beams emitted from the at least one light emitter in accordance with a change in the linear velocity of the at least one latent image carrier,
wherein, when reducing the linear velocity of the at least one latent image carrier from Vmax to V in a range satisfying a relation of Vmax>V, the controller reduces the rotation speed Rm of the rotary deflector to Rdef× (V/Vmax), if V/Vmax is larger than a certain value, and the controller reduces the number of light beams emitted from the light emitters to a value of Ndef/m, m is a positive integer, and the rotation speed Rm of the rotary deflector is reduced to Rdef×(V/Vmax)×m if V/Vmax is equal to or less than the certain value, where Vmax represents a maximum linear velocity of the at least one latent image carrier, Ndef represents the number of light beams emitted from the light emitter at the maximum linear velocity Vmax, and Rdef represents the rotation speed of the rotary deflector thereat.

* * * * *

UNITED STATES PATENT AND TRADEMARK OFFICE
CERTIFICATE OF CORRECTION

| | | |
|---|---|---|
| PATENT NO. | : 8,384,752 B2 | Page 1 of 1 |
| APPLICATION NO. | : 12/076200 | |
| DATED | : February 26, 2013 | |
| INVENTOR(S) | : Tomita | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1249 days.

Signed and Sealed this
Nineteenth Day of May, 2015

Michelle K. Lee
*Director of the United States Patent and Trademark Office*